US010423895B2

(12) United States Patent
Sunshine et al.

(10) Patent No.: US 10,423,895 B2
(45) Date of Patent: Sep. 24, 2019

(54) SPORTS AND CONCERT EVENT TICKET PRICING AND VISUALIZATION SYSTEM

(71) Applicant: TixTrack, Inc., Santa Monica, CA (US)

(72) Inventors: Steven A. Sunshine, Pasadena, CA (US); Rod Goodman, Long Beach, CA (US); Michael Arya, Pasadena, CA (US); Larry Chu, Van Nuys, CA (US); Michael Ripberger, Santa Monica, CA (US)

(73) Assignee: TixTrack, Inc., Santa Monica, CA (US)

(*) Notice: Subject to any disclaimer, the term of this patent is extended or adjusted under 35 U.S.C. 154(b) by 161 days.

(21) Appl. No.: 15/371,129

(22) Filed: Dec. 6, 2016

(65) Prior Publication Data
US 2017/0083836 A1 Mar. 23, 2017

Related U.S. Application Data

(60) Continuation-in-part of application No. 13/752,743, filed on Jan. 29, 2013, now abandoned, which is a
(Continued)

(51) Int. Cl.
G06Q 10/02 (2012.01)
G06Q 10/04 (2012.01)
(Continued)

(52) U.S. Cl.
CPC ............. *G06Q 10/02* (2013.01); *G06Q 10/04* (2013.01); *G06Q 30/02* (2013.01);
(Continued)

(58) Field of Classification Search
CPC ........ G06Q 30/02; G06Q 40/04; G06Q 10/02; G06Q 30/0283; G06Q 30/0601;
(Continued)

(56) References Cited

U.S. PATENT DOCUMENTS 5,333,257 A 7/1994 Merrill et al.
5,797,126 A 8/1998 Helbling et al.
(Continued)

FOREIGN PATENT DOCUMENTS

CA 2346756 A1 4/2000
EP 1526678 A1 4/2005
(Continued)

OTHER PUBLICATIONS

International Search Report and Written Opinion for PCT/US09/35024 filed on Feb. 24, 2009.
(Continued)

*Primary Examiner* — Igor N Borissov
(74) *Attorney, Agent, or Firm* — Richard T. Ogawa; Ogawa P.C.

(57) ABSTRACT

A system and method for displaying seat inventory at a venue and facilitating planning of ticket prices for events at the venue is presented. Methods to predict total revenue for an event are described. Also presented are systems and methods for determining at what price and when to release so-called 'flex' price tickets during an on-sale using the sales velocity and sales/inquiry ratios. Determining demand of seats from secondary markets is also described with methods to use the demand for either repricing the seats in the primary market or presenting 'best value' seats to a prospective purchaser.

14 Claims, 35 Drawing Sheets

Related U.S. Application Data continuation of application No. 13/585,714, filed on Aug. 14, 2012, now Pat. No. 8,639,541, which is a continuation of application No. 13/355,453, filed on Jan. 20, 2012, now abandoned, which is a division of application No. 12/422,171, filed on Apr. 10, 2009, now Pat. No. 8,126,748, which is a continuation of application No. PCT/US2009/035024, filed on Feb. 24, 2009.

(60) Provisional application No. 61/031,020, filed on Feb. 25, 2008, provisional application No. 61/055,142, filed on May 22, 2008, provisional application No. 61/098,765, filed on Sep. 20, 2008, provisional application No. 61/114,463, filed on Nov. 14, 2008.

(51) Int. Cl.
*G06Q 30/02* (2012.01)
*G06Q 30/06* (2012.01)
*G06Q 50/00* (2012.01)

(52) U.S. Cl.
CPC ..... *G06Q 30/0202* (2013.01); *G06Q 30/0206* (2013.01); *G06Q 30/0283* (2013.01); *G06Q 30/0601* (2013.01); *G06Q 50/00* (2013.01)

(58) Field of Classification Search
CPC ........... G06Q 30/0206; G06Q 30/0202; G06Q 10/04; G06Q 40/00; G06Q 50/00; G06Q 10/06; G06Q 10/025
USPC ........................................................ 705/5, 6
See application file for complete search history.

(56) References Cited

U.S. PATENT DOCUMENTS

| | | | |
|---|---|---|---|
| 6,023,685 A | 2/2000 | Brett et al. | |
| 6,078,893 A | 6/2000 | Ouimet et al. | |
| 6,729,959 B1 | 5/2004 | Moore et al. | |
| 6,993,494 B1 | 1/2006 | Boushy et al. | |
| 7,020,617 B2 | 3/2006 | Ouimet | |
| 7,031,945 B1 | 4/2006 | Donner | |
| 7,110,960 B2 | 9/2006 | Phillips et al. | |
| 7,127,408 B2 | 10/2006 | Rosen | |
| 7,203,665 B2 | 4/2007 | Donner | |
| 7,213,754 B2 | 5/2007 | Eglen et al. | |
| 7,391,854 B2 | 6/2008 | Salonen et al. | |
| 7,454,361 B1 | 11/2008 | Halavais et al. | |
| 2002/0082879 A1 | 6/2002 | Miller et al. | |
| 2002/0082881 A1 | 6/2002 | Price et al. | |
| 2002/0120492 A1 | 8/2002 | Phillips et al. | |
| 2003/0208764 A1 | 11/2003 | Galipeau et al. | |
| 2004/0093302 A1 | 5/2004 | Baker et al. | |
| 2004/0181438 A1 | 9/2004 | Hoene et al. | |
| 2004/0254818 A1 | 12/2004 | Rosen | |
| 2005/0139661 A1 | 6/2005 | Eglen et al. | |
| 2006/0095344 A1 | 5/2006 | Nakfoor | |
| 2006/0100985 A1 | 5/2006 | Mark et al. | |
| 2006/0173781 A1 | 8/2006 | Donner | |
| 2006/0195356 A1 | 8/2006 | Nerenhausen et al. | |
| 2006/0235768 A1 | 10/2006 | Tatum, Jr. et al. | |
| 2007/0041532 A1 | 2/2007 | Salonen et al. | |
| 2007/0055554 A1 | 3/2007 | Sussman et al. | |
| 2007/0255603 A1 | 11/2007 | Hosnedl et al. | |
| 2007/0265892 A1 | 11/2007 | Valentino | |
| 2008/0235161 A1 | 9/2008 | Salonen et al. | |
| 2008/0255889 A1 | 10/2008 | Geisler et al. | |

FOREIGN PATENT DOCUMENTS

| | | |
|---|---|---|
| EP | 1840806 A1 | 10/2007 |
| WO | WO 2000/65506 A2 | 11/2000 |
| WO | WO 2001/13299 A2 | 2/2001 |
| WO | WO 2001/44892 A2 | 6/2001 |
| WO | WO 2002/33572 A2 | 4/2002 |
| WO | WO 2003/005256 A1 | 1/2003 |
| WO | WO 2006/055021 A1 | 5/2006 |
| WO | WO 2006/055022 A2 | 5/2006 |
| WO | WO 2007/110330 A2 | 10/2007 |

OTHER PUBLICATIONS

Drake, et al. "Optimal Timing of Switches Between Product Sales for Sports and Entertainment Tickets," Naval Research Logistics, vol. 55, Issue 1, (New York: Wiley Periodicals, Inc. 2007), pp. 59-75.

McAfee, et al. "Dynamic Pricing in the Airline Industry," (Pasadena, CA: California Institute of Technology, undated), 44 pages.

Welki, et al. "US Professional Football: The Demand for Game-Day Attendance in 1991," Managerial and Decision Economics, 1994, vol. 15, pp. 489-495.

Office Action and List of References cited by the Examiner for U.S. Appl. No. 13/355,453 dated Mar. 15, 2012 from the United States Patent and Trademark Office.

Office Action and List of References cited by examiner for U.S. Appl. No. 13/355,453 dated Aug. 24, 2012.

| Event | Date | Venue | Price Range | | |
|---|---|---|---|---|---|
| Denver Nuggets at Los Angeles Clippers Tickets 4/8 | 4-8-2008 Tuesday 7:30 PM | STAPLES Center in Los Angeles, CA | $38 - $136 | Buy | Sell |
| Los Angeles Lakers at Los Angeles Clippers Tickets 4/10 | 4-10-2008 Thursday 7:30 PM | STAPLES Center in Los Angeles, CA | $55 - $4118 | Buy | Sell |

Browser

Back ▶ | http://www.secondarymarket.com

Hello, test@tixtrack.com   Logout

TicketFilter

Los Angeles Lakers at Los Angeles Clippers Tickets
Thursday, April 10, 2008 at 7:30 PM at STAPLES Center to Los Angeles, CA

Quantity # of Tickets

Price

☑ Show All
☐ $55 - $92
☐ $92 - $125
☐ $125 - $178
☐ $178 - $298
☐ $298 and up

Event

- Clippers vs Nuggets 4/8
- > Clippers vs Lakers 4/10

93 ticket listings are displayed in the map

| Section — 276 | Row — 278 | Qty — 280 | Price ▲ — 282 | |
|---|---|---|---|---|
| Upper Concourse 315 | 10 | 2 | $55.00 each | View Details |
| Upper Concourse 320 | 9 | Up to 3 | $60.00 each | View Details |
| Upper Concourse 325 | 6 | Up to 8 | $60.00 each | View Details |
| Upper Concourse 325 | 2 | 2 | $62.00 each | View Details |
| Upper Concourse 325 | 2 | 2 | $62.00 each | View Details |
| Upper Concourse 332 | 13 | Up to 4 | $65.00 each | View Details |
| Upper Concourse 319 | 11 | Up to 5 | $65.00 each | View Details |
| Upper Concourse 334 | 11 | Up to 4 | $71.00 each | View Details |
| Upper Concourse 319 | 9 | Up to 11 | $71.00 each | View Details |
| Upper Concourse 318 | 8 | 2 | $75.00 each | View Details |
| Upper Concourse 318 | 16 | 2 | $75.00 each | View Details |

FINAL RECOMMENDATIONS

RECOMMENDATION FOR FLOOR 2:
HOLD SEATS UP TO ROW 6 WITH PRICES:

| Row | 1 | 2 | 3 | 4 | 5 | 6 |
|---|---|---|---|---|---|---|
| Price | $536 | $375 | $309 | $270 | $245 | $227 |

POTENTIAL SECONDARY REVENUE
$30,272

RECOMMENDATION FOR FLOOR 1 AND FLOOR 3:
HOLD SEATS UP TO ROW 1 WITH PRICES:

| Row | 1 |
|---|---|
| Price | $268 |

POTENTIAL SECONDARY REVENUE
$5,415

RECOMMENDATION FOR SECTIONS 107 AND 116:
HOLD SEATS UP TO ROW 1 WITH PRICES:

| Row | 1 |
|---|---|
| Price | $288 |

POTENTIAL SECONDARY REVENUE
$8,539

RECOMMENDATION FOR SECTIONS 103-104 AND 119-120:
HOLD SEATS UP TO ROW 3 WITH PRICES:

| Row | 1 | 2 | 3 |
|---|---|---|---|
| Price | $157 | $147 | $142 |

POTENTIAL SECONDARY REVENUE
$26,080

RECOMMENDATION FOR SECTIONS 201-204 AND 229-232:
HOLD SEATS UP TO ROW 1 WITH PRICES:

| Row | 1 |
|---|---|
| Price | $81 |

POTENTIAL SECONDARY REVENUE
$9,013

TOTAL POTENTIAL SECONDARY REVENUE          $79,319

FIG. 20

Equivalent Section 1
Model Parameters:          A=4.47167146          Face $75          Sections: 2                              Data Quality=0.61904762
NoOfBestEqTickets=4                               alpha=-0.35675884

| Row | 1 | 2 | 3 | 4 | 5 | 6 | 7 | 8 | 9 |
|---|---|---|---|---|---|---|---|---|---|
| Premium | 4.47 | 3.49 | 3.02 | 2.73 | 2.52 | 2.36 | 2.23 | 2.13 | 2.04 |
| #Tix | 20 | 20 | 20 | 20 | 20 | 20 | 20 | 20 | 20 |
| Price A | 410 | 337 | 302 | 280 | 264 | 252 | 243 | 235 | 228 |
| Price M | 308 | 253 | 226 | 210 | 198 | 189 | 182 | 176 | 171 |
| Price C | 205 | 168 | 151 | 140 | 132 | 126 | 121 | 117 | 114 |

MinRow=8   MaxRow=21

| Premium | MaxRow | TotalTix | Potential A | Potential M | Potential C |
|---|---|---|---|---|---|
| 1 | 66 | 1320 | $148249 | $111187 | $74124 |
| 1.5 | 21 | 420 | $68154 | $51115 | $34077 |
| 2 | 9 | 180 | $37492 | $28119 | $18746 |
| 2.5 | 5 | 100 | $24345 | $18259 | $12172 |
| 3 | 3 | 60 | $16478 | $12358 | $8239 |

RECOMMENDATION FOR EQUIVALENT SECTION 1
HOLD SEATS UP TO ROW 9 WITH PRICES:

| Row | 1 | 2 | 3 | 4 | 5 | 6 | 7 | 8 | 9 |
|---|---|---|---|---|---|---|---|---|---|
| Price | 421 | 299 | 247 | 210 | 198 | 189 | 182 | 176 | 171 |

FIG. 21A

Equivalent Section 2                    Face $75            Sections: 1 3                       Data Quality=0.70588235
Model Parameters:      A=6.48139637                         alpha=-0.58827577
NoOfBestEqTickets=6                     MinRow=5            MaxRow=17

| Row | 1 | 2 | 3 | 4 | 5 | 6 | 7 | 8 | 9 |
|---|---|---|---|---|---|---|---|---|---|
| Premium | 6.48 | 4.31 | 3.40 | 2.87 | 2.51 | 2.26 | 2.06 | 1.91 | 1.78 |
| #Tix | 28 | 28 | 28 | 28 | 28 | 28 | 28 | 28 | 28 |
| Price A | 561 | 398 | 330 | 290 | 264 | 244 | 230 | 218 | 208 |
| Price M | 421 | 299 | 248 | 218 | 198 | 183 | 172 | 164 | 156 |
| Price C | 281 | 199 | 165 | 145 | 132 | 122 | 115 | 109 | 104 |

| Premium | MaxRow | TotalTix | Potential A | Potential M | Potential C |
|---|---|---|---|---|---|
| 1 | 3 | 84 | $29796 | $22347 | $14898 |
| 1.5 | 3 | 84 | $29796 | $22347 | $14898 |
| 2 | 3 | 84 | $29796 | $22347 | $14898 |
| 2.5 | 3 | 84 | $29796 | $22347 | $14898 |
| 3 | 3 | 84 | $29796 | $22347 | $14898 |

RECOMMENDATION FOR EQUIVALENT SECTION 2
HOLD SEATS UP TO ROW 3 WITH PRICES:

| Row | 1 | 2 | 3 |
|---|---|---|---|
| Price | 421 | 299 | 247 |

FIG. 21B

| Section | Row | Quantity | Price | PriceSTH | TicketID | Premium | Value |
|---|---|---|---|---|---|---|---|
| 101 | 14 | 2 | 225 | 145 | 111264898 | 55% | 0.20 |
| 101 | 13 | 4 | 300 | 145 | 108269937 | 107% | -0.14 |
| 101 | 13 | 2 | 325 | 145 | 114086090 | 124% | -0.31 |
| 101 | 9 | 2 | 325 | 145 | 119741575 | 124% | 0.42 |
| 2206 → 101 | 6 | 2 | 350 | 145 | 122411482 | 141% | 0.79 |
| 101 | 5 | 6 | 412 | 145 | 124587460 | 184% | 0.54 |
| 101 | 11 | 2 | 442 | 145 | 118843228 | 205% | -0.75 |
| 101 | 5 | 4 | 458 | 145 | 124291443 | 216% | 0.22 |
| 101 | 3 | 2 | 498 | 145 | 124291442 | 243% | 0.31 |
| 101 | 2 | 4 | 498 | 145 | 124291441 | 243% | 0.49 |
| 101 | 4 | 4 | 568 | 145 | 121387771 | 292% | -0.35 |
| 101 | 1 | 2 | 800 | 145 | 109739602 | 452% | -1.41 |

SPORTS AND CONCERT EVENT TICKET PRICING AND VISUALIZATION SYSTEM

CROSS-REFERENCES TO RELATED APPLICATIONS

The present application is a continuation-in-part of and claims priority to U.S. application Ser. No. 13/752,743 filed Jan. 29, 2013, which is a continuation of U.S. application Ser. No. 13/585,714, filed on Aug. 14, 2012 (now U.S. Pat. No. 8,639,541 issued Jan. 28, 2014), which is a continuation of U.S. application Ser. No. 13/355,453, filed on Jan. 20, 2012, which is a division of U.S. application Ser. No. 12/422,171, filed on Apr. 10, 2009 (now U.S. Pat. No. 8,126,748 issued Feb. 28, 2012), which is a continuation of PCT/US09/35024, filed on Feb. 24, 2009, and claims priority to and is a non-provisional application of U.S. Provisional Patent Application Ser. No. 61/031,020, filed Feb. 25, 2008, U.S. Provisional Patent Application Ser. No. 61/055,142, filed May 22, 2008, U.S. Provisional Patent Application Ser. No. 61/098,765, filed Sep. 20, 2008, and U.S. Provisional Patent Application Ser. No. 61/114,463, filed Nov. 14, 2008, the disclosures of which are each hereby incorporated by reference in their entirety for all purposes.

BACKGROUND OF THE INVENTION

1. Field of the Invention

The present application generally relates to data processing in financial, business practice, management, or cost/price determination in reservation, check-in, and booking display for reserved space. Systems and methods for sales, pricing, and distribution of tickets for concert, sports, and other events are presented. More specifically, the present invention relates to a system and method for facilitating the pricing of tickets at a venue prior to the event, displaying seat inventory at the venue, determining demand for tickets before, during, and after an initial on-sale, and automatically determining if prices should be changed or inventory should be redirected to a different distribution channel based on the demand for the tickets. The present application also relates to determining optimally valued tickets for purchase by a consumer and determining the appropriate customer for that ticket.

2. Description of the Related Art

Computer systems and networks have facilitated the task of buying, selling, and transferring goods. For example, global computer networks, such as the Internet, have allowed purchasers to quickly and efficiently seek and purchase goods on-line. Buying and selling tickets online to events at sports stadiums, arenas, theaters, entertainment clubs, and other venues has become a multi-billion dollar industry.

The accurate pricing of tickets is sometimes critical to achieve maximum revenues for an event. Prices that are too high will curb demand, while prices that are too low will create ample demand but at a non-optimal price. For sports teams, prices are typically determined at the beginning of a season, and pricing adjustments are made through promotions, give-aways, or other mechanisms. However, the face value of the tickets often remains unchanged. For concerts and other "one-off" events, pricing can be independent of other events.

The relative pricing of tickets within a venue is also a challenge. Currently, prices are typically determined by their 'section' in a venue. The closer, more centered, and less obstructed the view of the event from the section, the better the seat and the higher the ticket price. Seats with comparable views can be considered seats of comparable seat quality. In some venues, floor tickets in a given section will be priced higher than the rest of the seats in that section. Today, these pricing decisions are typically made based on personal experience of promoters, venue representatives, and other industry professionals.

In a venue, a 'seat' is not necessarily a chair, bench, or other apparatus upon which one sits down. Instead, a seat can include an open space for a wheelchair, stroller, or similar conveyance, a position in a general standing area, a place to bring one's own chair and picnic basket, or other definitions as known in the art. A seat can also include a parking place for drive-in theater, a dock along a log-boom for watching a hydroplane race, a rail upon which to tie up a horse, or other positions upon which a vehicle or conveyance can be parked, anchored, or moored. For clarity and simplicity in explanation, individual seats will be referred to in the examples of this specification, although the broader term is certainly envisioned.

There are many types of revenue management challenges in sports and entertainment planning, including how to price events. Pricing an event commonly occurs in advance of the beginning of ticket sales, but can also occur over time during the sale period of tickets and even during the beginning of the event. Other challenges related to pricing include deciding what discounts should be offered or what premiums should be charged, to whom and when to offer or charge the discounts or premiums, and issues around grouping events into packages. Ticket packages can include multiple tickets for different events at the same venue and different events at different venues. Packages can also include tickets sold for the same event at the same venue for large parties, for example group discounts.

Selling events in bundles as season or partial-season tickets is an important revenue management area, especially for sporting events. Customers who purchase bundles are committing to multiple events, but at reduced per-event ticket prices. The customers are assured that they will be able to attend events throughout the season. Season tickets may yield revenue benefits for the selling organization, such as early cash flow and reduced risk. Thus, bundled ticket products are prioritized and are generally sold first in the selling season, while individual tickets for those events are made available at a later date. Determining the proper mix of bundled sales and single seat sales can be an important decision.

Often, pricing is determined based on a total or net revenue target associated with the event rather than on demand for that particular event. The pricing of events often involves the use of a spreadsheet which contains the number of seats in each section. Prices for each section are estimated and added to the spreadsheet, and the total revenue is calculated by multiplying the section price by the total seating capacity for that section. Pricing is altered until a certain targeted total revenue is met. From the spreadsheet, a venue map is then colored by hand to give a visual representation of the seating arrangement and corresponding price levels. The tradeoff between sections, pricing levels, and other factors is tracked in the minds of the venue representatives and promoters. The ability to visualize the seating arrangements in a venue map is not directly linked to the ability to calculate financial information.

Ideally, prices would be established before an event takes place and these prices would never need to be altered. However, it may also be desirable to change prices once an event has gone on sale. If the initial indication is that demand is greater than expected, it would be desirable to raise prices. If demand is lower than expected, it may be desirable to lower prices.

Recently there has been a growing interest in revenue management systems. This is particularly true for perishable products. A perishable product is one where the item has no value beyond a certain date. One obvious example is a food product susceptible to spoilage, but hotel rooms, airline seats, and event tickets are also examples of perishable products. See U.S. Pat. No. 7,020,617 issued Mar. 28, 2006 to Ouimert and U.S. Pat. No. 6,078,893 issued Jun. 20, 2000 to Ouimert et al., both hereby incorporated by reference for all purposes. Airline seats and hotel rooms are particularly of interest in some recent studies. See U.S. Pat. No. 6,993,494 issued Jan. 31, 2006 to Boushy et al. and R. Preston McAfee and Vera to Velde, "Dynamic Pricing in the Airline Industry," (Pasadena, Calif.: California Institute of Technology, undated), 44 pages. These systems use past history and current inventory data to manage revenue and profit.

More recently, there has been an attempt to apply these types of systems to sports events and concerts. See U.S. Pat. No. 7,110,960 issued Sep. 19, 2006 to Phillips et al., which is hereby incorporated for all purposes. See also Welki, Andrew M. and Thomas J. Zlatoper, "US Professional Football: The Demand For Game-Day Attendance in 1991," *Managerial and Decision Economics*, Vol. 15, Issue 5, Special Issue: The Economics of Sports Enterprises (September-October, 1994) (New York: John Wiley & Sons, 1994), pages 489-495. See also Drake, M. J., S. Duran, P. M. Griffin, and J. L. Swann, "Optimal timing of switches between product sales for sports and entertainment tickets," *Naval Research Logistics*, Vol. 55, Issue 1, (New York: Wiley Periodicals, Inc., 2007), pp. 59-75. Determining pricing for sports events is sometimes more challenging than pricing airline seats and hotel rooms because there is more consistency in the airline or hotel industry. For example, typically an airline will fly the same plane the same day of the week at the same time to the same destination. Past history is a good indicator of future demand. In sports, however, demand is dependent on many factors including the opponent, the day of the week, if a player gets injured, or even the weather. Most past effort has focused on establishing the proper relationship between the many variables and demand. These systems can be very complex; thus, demand is still typically estimated by sales and marketing personnel based on their own past experience and intuition. This challenge is further complicated as the value of a ticket is also dependent on the location within the venue (as compared to an airline where all coach seats traditionally are considered of equal value).

Pricing for concerts and other "one-off" events can be more challenging than sporting events where the same team may play multiple games in the same venue. For these "one-off" events like concerts, boxing matches, ice shows, etc., pricing is often determined by targeting a specific total revenue assuming some portion of the seats sell. Promoters may use past history to estimate demand, but often this data is old, and customer preference, economic factors, and other issues impacting demand may have changed significantly for the current event relative to demand for a prior event.

One key to all of these challenges is being able to determine demand for the event, and then converting this demand into a fair price for tickets. Historically, tickets were only sold once, although there has almost always been "scalping," or the ability to sell a ticket in the aftermarket. A recent proliferation of secondary marketing companies, particularly those that sell tickets on the web, has greatly increased the number of tickets that are resold. The availability of tickets in the aftermarket has important implications for the sale of original tickets. For example, tickets selling for a discount in the secondary market will negatively impact the sale of full price tickets in the primary market. The original, or primary, ticket market encompasses all instances in which event tickets are sold for the first time. The secondary ticket market encompasses all instances in which event tickets trade after the original point of purchase.

Original and secondary event ticket markets are known in the art. See U.S. Patent Application Pub. No. 2006/0095344 published May 4, 2006 for Nakfoor and U.S. Patent Application Pub. No. 2004/0093302 published May 13, 2004 for Baker et al., both hereby incorporated for all purposes.

There are a large number of secondary ticketing sites that enable the purchase of resold tickets through the Internet. Customers looking to purchase the ticket with the best overall value typically must browse from site to site and manually compare listings, both within one site and across multiple sites.

Once pricing is established, effective marketing of those tickets to the right customer poses another challenge. Determining which potential customers are most likely to purchase a specific type of product, whether in the primary or secondary market, can be difficult given the wide range of customers and varying and ever-changing interests of the public. Typically, customer analysis is done across all customers, but the exact nature of customer interest in an event may depend not only on the event but also on how much the customer is willing to pay for a ticket to that event. The customer profile may also depend on where the customer wants to sit in the venue.

Thus, there is a need for a system that is capable of more accurately forecasting demand for events and optimizing pricing for that event. There is also a need for this system to facilitate the price planning and inventory tracking process for events. There is also a need for this system to provide recommended price changes once an event goes on sale. There is a further need for this system to be able to correlate the demand to a specific customer demographic to aid in the marketing for the event. Finally, it is desirable for this information to be viewed in a format that is easy to interpret.

There is also a need to clearly display available inventory to potential purchasers of primary and secondary seats where the value of prospective seats is also clearly displayed.

BRIEF SUMMARY OF THE INVENTION

Embodiments in accordance with the present disclosure relate to planning, editing, tracking, recommending, and determining pricing and distribution channels for event tickets. During the planning stages of an event, an embodiment can (1) determine an estimate of pricing from external data and (2) determine pricing for recurring events (e.g., sports seasons). Pricing is determined by analyzing secondary market data, web traffic, and other variables. Another embodiment can (3) use a price planning software tool to visualize and edit pricing. Price levels are correlated to various seats for an event at a venue using a venue map in a web-based environment in order to track potential revenue dynamically during the pricing process. Another embodiment (4) tracks inventory once the event goes on sale, either by (4a) current snap shots or by (4b) sales over time. Inventory status is managed visually in the same web-based environment by accessing an inventory database. Changes in inventory over time for an event can be visualized in graphical form, or a movie of how inventory changes with time can be created and analyzed to determine current and future demand patterns. Demand can be determined using multiple methods, including gathering and analyzing prices for comparable seats in the secondary markets, determining sales velocity in the primary market, and analyzing the correlation of inquiries and seats sold. Yet another embodiment can (5) make recommendations for pricing and distribution based on data around the on-sale. Prices can be adjusted accordingly to an analysis of the data to maximize revenues. The price of certain seats, rows, or sections can be (5a) increased or decreased ('flexed') based on demand, or (5b) tickets can be redirected to the secondary market to increase revenues. These pricing mechanisms provide a means to dynamically match prices with demand. Further, some embodiments include (6) an improved system for presenting secondary inventory for purchase. A further embodiment can (7) match available inventory to the proper customer.

The numbering in the above paragraph and section headings below are added for clarity an are not intended in any way to delineate features or aspects of the invention which must be represented in an embodiment. Many features are disclosed in this specification which may or may not fall within the scope of the headings. One should refer to the claims as issued in a patent by the Patent Office to determine the metes and bounds of the invention and use the entire disclosure to determine the legal equivalents therein.

In an embodiment, the invention discloses a method for determining a number of open seats to be allocated for sale for a given price at an event during an initial sales period using a computer aided process. The computer aided process comprises placing an initial set of a plurality of open seats for sale at a first price; storing information associated with the initial set of the plurality of open seats in a computer readable memory coupled to the computing device; reserving at least one seat within a vicinity to each open seat from the initial set of the plurality of seats so each seat within the vicinity to each open seat from the initial set of the plurality of seats is in a hold status, the hold status is not available for sale; identifying a first number of open seats from the initial set of the plurality of seats that have been sold or are being considered for purchase; calculating, under control by a processor, a second number of the open seats to sell at a determined point in time based on a time dependence of the first number of open seats sold and/or being considered for purchase; determining, under control by a processor, if the initial set of open seats placed for sale at the first price is smaller than the second number that is calculated to sell, and if the second number of seats projected to sell is greater than the initial number placed for sale, releasing a number of the seats within the vicinity of each open seat for sale at the first price; and outputting the number of seats that have been released.

One embodiment in accordance with the present disclosure relates to a computerized method for determining prices for an event at a venue having seats, the method comprising modeling two or more external variables including but not limited to web site traffic, radio play time, prior sales, size of the city or region where the event will take place, venue size, the demographics of the city where the event will be held, and the demographics of the customers that frequent the planned or similar events. The computerized method fits sales for a prior known event with one or more external variables to a mathematical model and determines pricing for a future event based on the values of the same external variables for said future event.

Another embodiment relates to a computerized method for determining ticket packages for events, the method comprising determining, using principal components analysis, an event quality for each of multiple events, calculating an average event quality of the multiple events, and grouping the events into two or more groups. The events are grouped into groups of like event qualities. The method further includes packaging one or more events from one of the groups with one or more events from another of the groups such that an average of the packaged events is substantially equal to the average event quality of the multiple events. "Substantially equal averages" are those which are generally equal, including those which are within ±10%, ±25%, or greater of each other.

Another embodiment relates to a computerized method for determining pricing for multiple similar events, the method comprising receiving a list of seat tickets and corresponding prices for sale on a secondary market, filtering the list to remove outliers, determining the pricing or premium of the secondary market inventory for multiple similar events, fitting the price or premium for each event to the total revenue generated for that event to a mathematical model, and determining revenue for a future event not used in the model based on the secondary pricing or premium for that event.

Another embodiment in accordance with the present disclosure relates to a computerized method for price planning an event at a venue having seats, the method comprising providing price levels for an event at a venue, receiving rules to attribute the price levels to the seats, and correlating each price level with the seats according to the rules. The method further comprises displaying the price levels correlated with the seats on a venue map and calculating a total projected revenue for the event using the price levels and a number of seats correlated with each price level.

Another embodiment relates to a computerized method for tracking and displaying a seat inventory of an event on a venue map, the method comprising providing a map of a venue, the map having graphics depicting seats, receiving a sales status of the seats from a database, and displaying the sales status of each seat with the corresponding seat graphic on the map.

Another embodiment relates to a computerized method for tracking and displaying a seat inventory of an event on a venue map, the method comprising receiving a first status of an inventory of seats at a first point in time, displaying the first status of the inventory of seats on a venue map, and receiving a second status of the inventory of seats at a second point in time. The method also includes updating the venue map with the second status of the inventory of seats on the venue map. A sequence of such updates may result in a movie.

Another embodiment relates to a computerized method for tracking and displaying a seat inventory of an event on a venue map, the method comprising receiving a first status of an inventory of seats at a first point in time, receiving a second status of the inventory of seats at a second point in time and providing a chart or graph of the inventory as a function of time.

Another embodiment relates to a computerized method for selecting inventory pricing for an event at a venue, the method comprising determining a rate at which a first inventory of seats have sold for an event at a venue and calculating a demand for a second inventory of seats based on an algorithm which uses the rate at which the first inventory of seats sold. The seats of the first and second inventories are comparable in quality. The method also includes determining one of a plurality of price levels at which to release the second inventory of seats using the demand.

Another embodiment relates to a computerized method for selecting inventory pricing for an event at a venue, the method comprising receiving a first sales status for a first plurality of seats for an event at a first time point, the first plurality of seats having a first price level, receiving a second sales status for the first plurality of seats at a second time point, and calculating the number of seats that will be sold at some time in the future by analyzing the first sales status and the second sales status. The method further includes algorithmically predicting a number of seats that could be moved from a second price level to the first price level based on the predicted demand of tickets at the first price level.

Another embodiment relates to a computerized method for determining the value of an available inventory of seats to an event if sold in the secondary ticket market, the method comprising receiving a list of seat tickets and corresponding prices listed for sale on a secondary market, grouping the seat tickets in the list by equivalent sections of seats, filtering the list to remove outliers, and fitting the prices of one of the groups of seat tickets as a function of row to a mathematical model. The method further includes calculating a potential price for seats in each row from the mathematical model and determining whether inventory of unsold seat tickets is priced lower than the calculated potential price. Still further, the method includes filtering the inventory of primary seat tickets based on the determination of whether the seat is priced lower than the calculated potential secondary price and displaying the inventory that could achieve higher prices in the secondary market than in the primary market.

Another embodiment relates to a computerized method for displaying available inventory of seats to an event for sale in the secondary ticket market, the method comprising receiving a list of seat tickets for sale on a secondary market, grouping the seat tickets in the list by equivalent sections of seats if desired, and determining one or more best valued seats based on the seat price relative to the mathematical model.

Another embodiment relates to a computerized method of determining likely customers for a particular event ticket, the method comprising associating demographic descriptors to customers of a similar prior event, correlating the demographic data to ticket price paid for the prior event, thereby determining the demographic profile of customers of a future event as a function of ticket price.

Yet other embodiments relate to systems and machine-readable tangible storage media which employ or store instructions for the methods described above.

A further understanding of the nature and the advantages of the embodiments disclosed and suggested herein may be realized by reference to the remaining portions of the specification and the attached drawings.

BRIEF DESCRIPTION OF THE DRAWINGS

FIG. 1 illustrates a web page of a secondary market web site.

FIG. 2 illustrates a second web page of the secondary market web site of FIG. 1.

FIG. 8A illustrates a web page for correlating price levels with sections of seats in accordance with an embodiment.

FIG. 8B illustrates a web page for correlating price levels with multiple sections of seats in accordance with an alternate embodiment.

FIG. 20 illustrates a web page with final recommendations according to an embodiment.

FIG. 21A illustrates a table showing data and recommendations using an algorithm according to an embodiment.

FIG. 21B illustrates a table showing data and recommendations using the same algorithm as in FIG. 21A.

Figure 3:
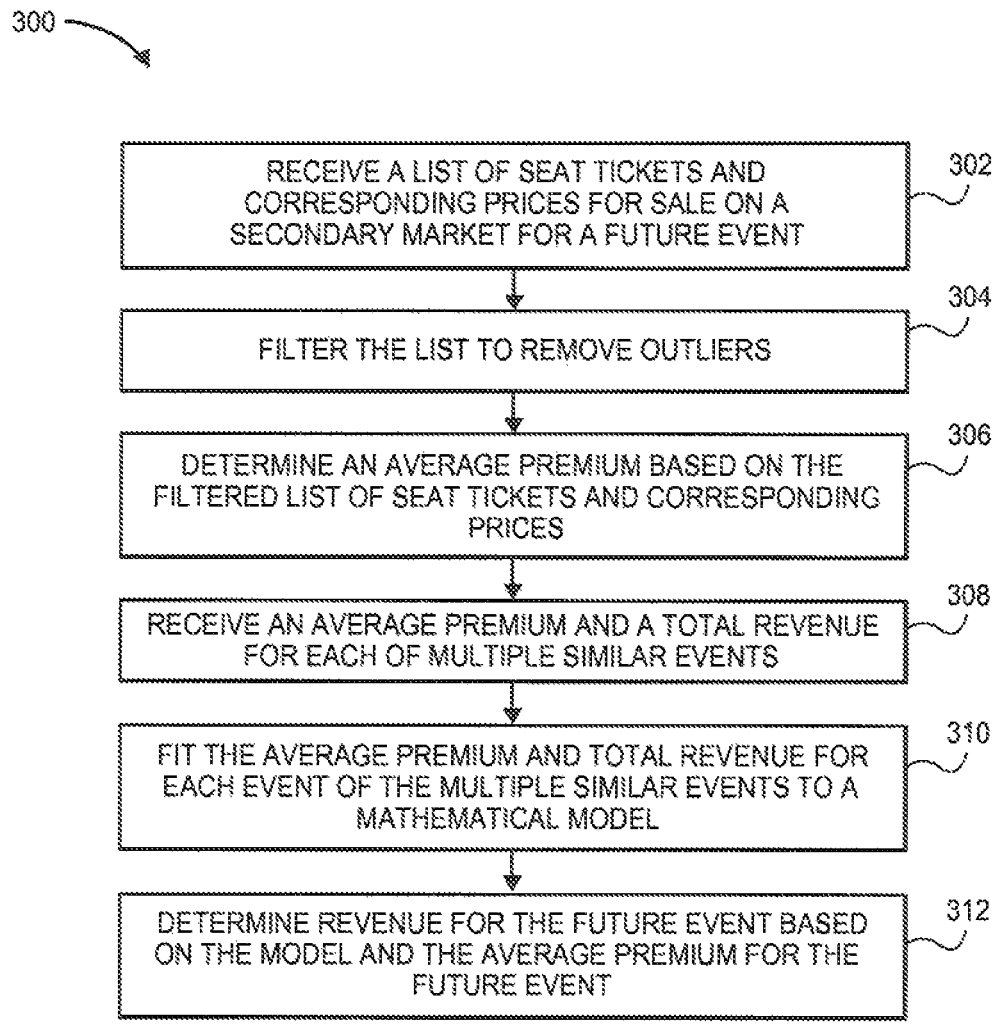
FIG. 3 illustrates a venue map showing seats available.

The figures will now be used to illustrate different embodiments in accordance with the invention. The figures are specific examples of embodiments and should not be interpreted as limiting embodiments, but rather exemplary forms and procedures.

DETAILED DESCRIPTION OF THE INVENTION (1) Determining Prices

Planning for ticket prices for event or series of events, such as basketball games, occurs weeks, months, or even years before the first ticket to the event is sold. Much of the planning is performed by promoters and representatives of the venue where the event will be held. Other experienced professionals and stakeholders in the event industry may also help in price planning.

In planning for an event, promoters and venue representatives determine what seats will be made available in the venue as inventory. In hashing out what ticket price levels (i.e., dollar amounts) to employ and which seats should be sold at what price levels, the promoter and venue representatives weigh a large amount of data relating to historical prices, seating layouts, restricted areas, and setup eccentricities corresponding to the event at issue. Much of this is performed in the minds of the representatives based on experience with similar events or "last season's" prices. There are a multitude of variables to be considered in light of mass consumer preferences and expectations, not the least of which are the layout of seating for the particular event being planned.

Venues can typically be rearranged between different types of events, such as between sporting events and concert events. For example, a sporting event may call for all seats to be available in the stands and no seats available on the field, while a concert event may fill the floor of the arena with seats and kill or otherwise restrict from sale seats behind a stage. Some sporting events have different seating layouts than others. For example, basketball, which features seats near the ground and close to the action, typically has a different seating arrangement than football, which features seats farther away from the field. Some events, such as soccer and football, may have equal seating arrangements. Likewise, different concerts and entertainment events may have similar or different layouts, depending on the artists involved, types of performance, or types of production. Seating layouts may be predetermined by the promoter, venue, or artist, or the seating layout may be determined in conjunction with pricing.

Often, the first step in planning an event is to determine pricing. Sometimes there is not adequate data associated with the event to provide accurate pricing. For example, a particular band may not have toured for several years. In this case, data for a similar act can be used to augment the information. The similar act can be determined by comparing key variables of the act of interest with those of other bands. Key variables may include the type of music the band performs as well as the audience demographics the band attracts. These variables can associated with a cardinal or ordinal value and be compared using clustering software, such as principal component analysis (PCA). In this way, past events similar to those of the current event can be quantitatively recognized and presented.

After past events are recognized, revenue and other demand-indicating data from those events can be analyzed to estimate current demand for the event being planned.

A mathematical or computerized simulation model can be used to estimate the demand. Key variables that can be incorporated into the model may include venue size, demographics of the act's fans, demographics of the city for the event, the population of the city or area where the event is to be played, the number of Internet searches for the artist from the city or area where the act has played and plans to play, the frequency with which the artist's music is played on the radio, and the number of other events that occurred or are planned to occur at the same time and in the same city of the event of interest.

In one analysis performed by the inventors, the most important variables to determine demand were determined to be total population of the city for the event, the number of on-line searches for the artist in the city of the event, and the radio play time for the artist in the city of the event. By fitting these variables to total concert revenue in cities where the act or comparable act had already performed, a model was generated and then applied to cities where the act had not yet performed. By using the population, search information, and radio play time for these new cities, a projected revenue was calculated. This total revenue was then used to determine average ticket pricing based on different seating configurations (i.e., projected revenue/number of seats=price per seat).

Thus, determining demand for an event such as a concert can be analytically determined. Such a determination may be proceduralized and then optimized to create the best pricing levels for an event.

(2) Pricing Multiple Events—Season Tickets and Packages

Pricing multiple events, such as a season of football games, presents a different set of challenges than pricing for individual events. For sports events that feature a whole season of home games played at the same venue, season tickets and group packages complicate demand and pricing models because of cross-coupling between games at different times of the year, different nights of the week, and playoff and regular season games.

At times it may be helpful to create groupings of events based on the desirability of the events or so-called 'event quality.' This can be used in the creation of bundling plans where highly desirable events are combined with less desirable events to create mini-season ticket plans. This is particularly true for sports teams that play multiple games each season. In order to properly group events, it is often important to establish the relative value for each event or game. One method to define event quality is by using a clustering analysis such as hierarchical cluster analysis or principal components analysis (PCA). This technique allows demand oriented variables to be analyzed simultaneously to provide an indication of similarity across these events. Key variables could include historical data such as total revenue, group revenue or sales on the day prior to the event from the preceding year. The PCA can also use additional non-revenue based information that may impact revenues, such as changes in personnel since the revenue data was collected, etc. These factors can sometimes create a significant change in event desirability or game quality. Principal component analysis is then used to group these events in terms of desirability. This will result in two or more groups. Packages can then be created by taking single events from the different desirability levels. For example, a highly desirable event can be combined with a less desirable event to create a package.

The secondary market can also play an important role in indicating event desirability or game quality. In fact, it is sometimes possible to draw a direct correlation between secondary premium and total revenue for an event. The event desirability or projected total revenue can be used to determine pricing for the events.

An analytical correlation between ticket prices in the secondary market and future ticket sales has been developed by the inventors. If tickets are selling at a large premium in the secondary market, this suggests that there will be high demand in the primary market. A mathematical formula has been created that correlates secondary demand and primary demand for tickets.

In addition to determining demand, this method also allows for a determination of fair market pricing. Often tickets are listed for sale in the primary market at prices well above those in the secondary market, such that the tickets in the primary market will not sell. Conversely, sometimes tickets are on sale in the primary market for prices well below those in the secondary market. The method described allows for a precise understanding of the fair market price. This can be used to rationalize promotions or create pricing premiums so as to maximize revenues for a given event.

The method can use either actual secondary ticket sales or it can use listed tickets on the secondary market, even if they have not sold yet. If listed tickets are used, the data should be corrected for tickets being listed at abnormally high or abnormally low prices. These ticket prices sometimes indicate factors personal to the sellers which should not reasonably be aggregated to determine market supply/demand.

To correct for abnormally high or low prices on the secondary market in one embodiment, all data that is more than 1.5 interquartile ranges from the upper or lower quartile is rejected. The interquartile range is the distance between the lower and upper quartiles. The remaining data is re-examined, and any additional data that falls outside of this limit is also rejected. This analysis is repeated until all data falls within 1.5 interquartile ranges. Other techniques can be used to eliminate unusual listings.

In a preferred embodiment, the first step is to gather and assemble information about tickets and/or sales in the secondary market. This can be done manually or can be accomplished using automated computer software, for example by so-called crawling software that retrieves information from one or more public websites accessed via the Internet. In addition, computer software can directly access private databases of ticket information if access has been arranged. Such databases can interact with the automated computer software via a plurality of means such as SFTP (Secure File Transfer Protocol), direct SQL client-server interchange, etc.

FIG. 1 shows one example of a web page of a secondary market for tickets. Different events are listed, and the range of prices for each event are summarized for the user.

FIG. 2 shows an example of a web page accessible by clicking on one of the events listed in FIG. 1. A list of tickets, accompanied by section numbers, is tabulated. The table has section column 276, row column 278, quantity of tickets for sale column 280 and price column 282. By clicking on the respective 'View Details' link, more information can be obtained about the tickets for sale on the secondary market. This information can include the exact row and seat number of the seat(s) offered for sale, as well as the ticket ID or whether the seat(s) are located on an aisle.

If Internet sites are crawled, such as those with web pages similar to FIGS. 1 and 2, then analysis software in an embodiment first assembles a ticket file in native Extensible Markup Language (hereinafter "xml") code. This native xml file is then parsed by the software to extract relevant variables such as Ticket ID, Section, Row, Seat (if available), quantity, price, and other special indicators such as whether or not the seat is an aisle seat etc. The software can also use rules coupled with the known arena seating plan to determine the seat parameters. The xml ticket information, which often contains the seating information in free-form English which is not directly parsable, can be decoded for later use. For example, a courtside seat may be annotated "CT", "Court", "Courtside", "Floor", etc. in the xml file. The software can have rules and intelligence to uniquely decode these annotations. Depending on the amount of seats listed or other factors, either one or more Internet sites may be crawled for data.

FIG. 3 illustrates a seating plan for a basketball game in an arena. Many seats in the arena stay constant from event to event, such as those in upper sections. Other seats may be arranged differently, such as those on or near the floor around the basketball court. The software can use information from past seating arrangements to determine the distance a seat is from the court, from an aisle, and other factors important to consumers. This distance and other factors are then associated with the seat data from the xml file.

The software also relates the ticket price to the "face value" (or par value) of the ticket and the season ticket value of the ticket. To determine the season ticket value of a ticket, the price of the season ticket can be divided by the number of games in the season. The face value and season ticket price can usually be obtained from public and private sources.

The parsed and decoded ticket data is then stored in a database, including annotations regarding the event ID, game, date, etc. The time and date of the crawling and analysis can be included to allow for subsequent analysis of ticket data over time.

The database used can be any one of a number of standard types, such as an ORACLE® database, Microsoft SQL Server® database, or other databases known in the art. The database can also be a mix of several databases and/or database types as well. The use of a database helps store and organize the data. Other methods of data storage besides databases are contemplated, such as data files.

Once the ticket database is established it may be queried in a number of ways to extract relevant information. More complex queries are also possible, such as the ticket price history over time (e.g., 9 days).

A number of data can be extracted from the database. First, the price history of the ticket over time can be established. If the price history is changing, then the price history can be trended, and a prediction for a future date established. Second, the true selling price of the ticket can be established as the price just before the ticket disappears from the database. Third, any rapid change of price (e.g., over a few days or hours) can be detected and an automated alarm brought to the attention of an operator. This may indicate a loss of a key player or other relevant external events.

From each data point for a point in time for each seat ticket, a discount or premium is calculated. A "premium" is a ratio of the price for a particular seat ticket in the secondary market over the face value of the same ticket, preferably expressed as a percentage. A "discount" is simply a negative premium. An equation to determine the discount/premium is:

$$\text{premium} = (\text{price}_{secondary\_market} - \text{price}_{face\_value}) / \text{price}_{face\_value} \quad \text{(Eqn. 1)}$$

where $\text{price}_{secondary\_market}$ is the price on the secondary market and $\text{price}_{face\_value}$ is the price printed on the physical ticket stub. A discount/premium can also apply to season tickets with respect to the season ticket price as opposed to the face value.

The secondary market discount or premium can be used to determine the pricing of tickets. If an event is selling for a discount in the secondary market, then new sales of tickets should also be at a discount to compete with the secondary pricing. The secondary market discount or premium can be used to determine group pricing and individual pricing strategies. An event trading at a secondary market discount may be sold to groups at a similar discount. An event trading at a premium in the secondary market would suggest that a premium should be charged on original ticket sales as well.

To aggregate the many different tickets for each event, the average of all the premiums in the secondary market(s) can be calculated. The resulting average premium can be associated with the event for further analysis.

For many sports teams or venues it is optimal to correlate the average premium to known results for some number of events. As an example, a plot of average secondary market premiums versus total revenues can be made for multiple events, and the relationship between secondary market premium and the total revenues can be established.

Figure 4:
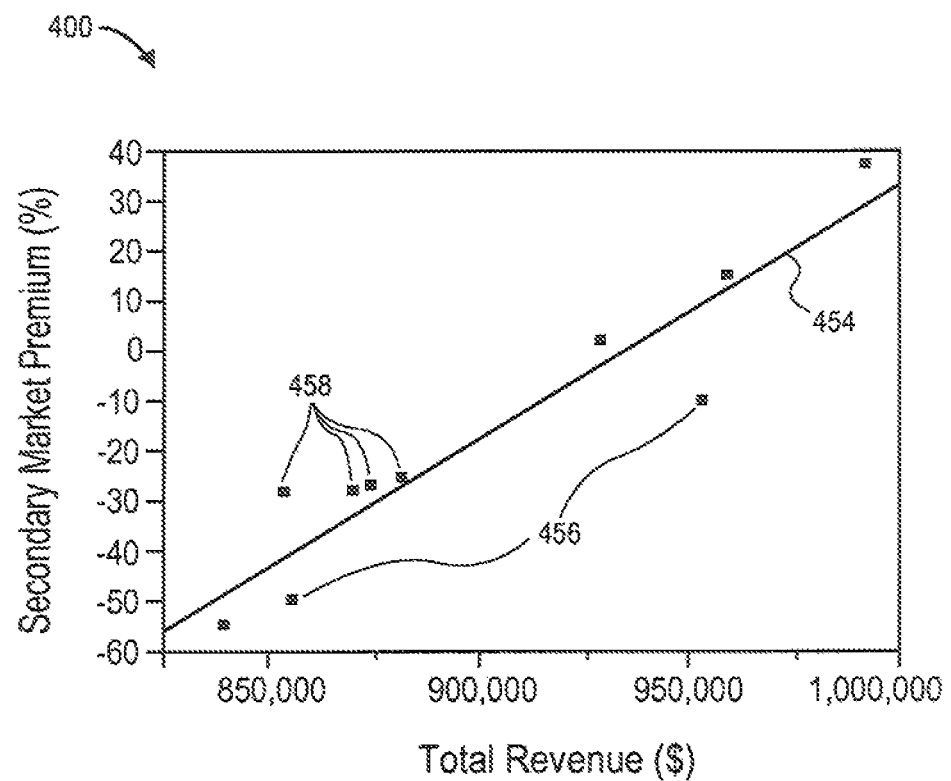
FIG. 4 illustrates secondary market discounts/premiums of different events plotted versus total revenue.

FIG. 4 illustrates the average secondary market premiums as compared to the total revenues that were obtained for corresponding events. The discount/premium for each ticket at an event is averaged into an average discount/premium for the event, and the average discount/premium is then plotted with total revenue for the event on an x, y scatter chart. It can be seen from the chart that the games with the largest secondary market discount (i.e., a negative premium) had the lowest total revenue.

Line 454 is mathematically fit between the points so that future revenues can be predicted. For example, if secondary market sales indicate a discount of −10% from the face value of the tickets, then the total revenue can be predicted (from the straight line fit) to be $915,000.

In the figure, a linear equation is fit to the data, although it should be apparent to one skilled in the art that curve fits could take some other functional form (e.g., polynomial). In this particular example, the linear correlation indicates that the total revenue of a future event can be calculated from the secondary market premium as total revenue=(secondary_market premium*468.7)/0.0005011, where total revenue is in U.S. dollars and secondary market premium is expressed as a percentage. This correlation can then be applied to events in the future where the total revenue is not known but is desired. For example, the results of the first ten games in a season can be used to predict the revenues for the next fourteen games. The inventors have found in several analyses that agreement between the predicted and actual revenues was within 10% and was better than 1% on average. This prediction can be repeated with time as an event approaches as the premium or discount in the secondary market may change with time. The correlation analysis described above used only the secondary market premium, but it could also use additional information like the day of the week of the event, the won/loss record of the team, or other pertinent information. In certain aspects, the exact correlation will not be the same for each team, performer, or act and will generally need to be determined separately for each case.

Figure 5:
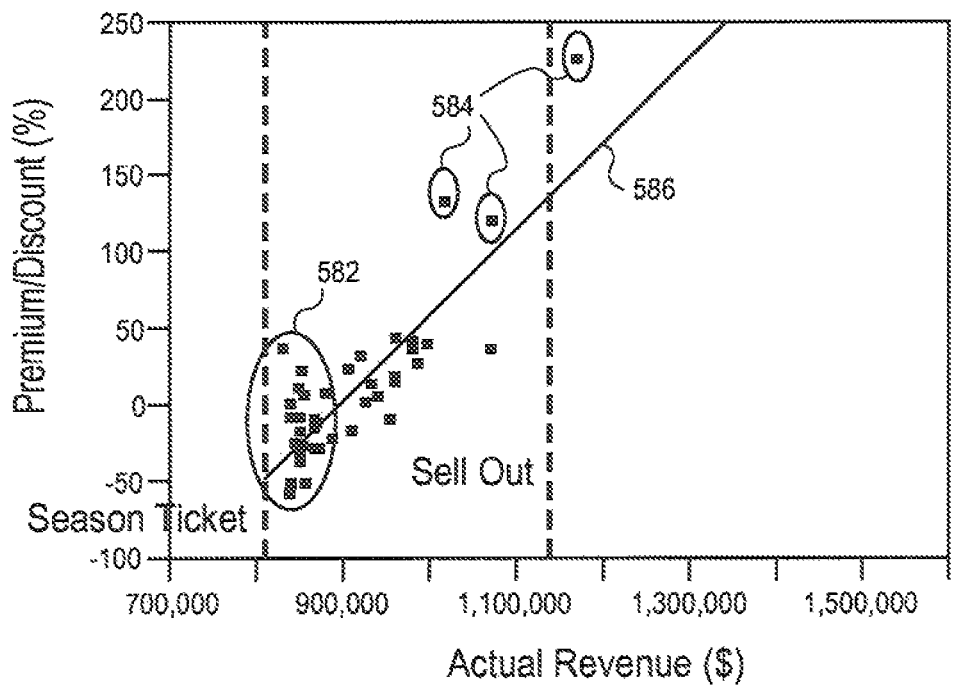
FIG. 5 is a plot of secondary market discounts/premiums for various events versus total revenues for the events.

FIG. 5 shows such data plotted for an entire basketball season of events at an arena (i.e., home games). Some events had already occurred and other were still to be played. The left vertical dashed line indicates the minimum revenue that could be collected from each event. This minimum is determined from the apportioned revenue of season tickets that have already been sold. The right vertical dashed line in the figure indicates the maximum revenue that could be collected in the primary market from each event if each and every ticket were sold at face value. The secondary premiums and total revenues for the initial ten games that had already been played were analyzed as described above and linear fit 586 was determined.

An event is predicted to sell out if the secondary market premium is greater than the premium indicated by the intersection of the vertical sell out revenue line and linear fit 586 as determined by the premium to total revenue relationship. Events 584 have a secondary demand that suggests that they should sell-out. The three data points corresponding to events 584 do not fall along the sell out vertical dashed line either because some tickets were subject to group discounts and other price alterations or because the event had not been played and not all of the revenue had been generated. It should be noted, however, that without raising prices above face value, it will not ordinarily be possible to generate the revenue that the secondary market predicts. The events with a premium below the intersection of the season ticket floor intersection with the same fit are indicative of those events that would not attain the total revenue level without season ticket sales.

Figure 6:
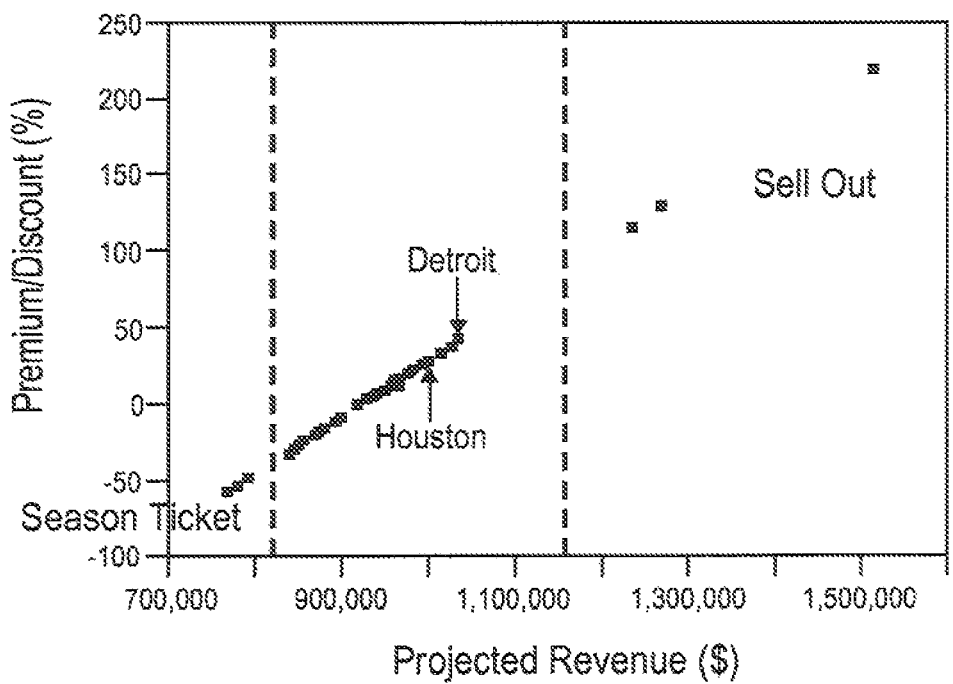
FIG. 6 is a plot of secondary market discounts/premiums for various events versus projected revenues for the events.

FIG. 6 shows the predicted revenue versus the secondary market premiums as calculated using the equation of linear fit 586 of FIG. 5. Since the projected revenue for future events can be calculated as soon as there are tickets for sale in the secondary market, often months before an event, such information can be used to determine prices and marketing strategies for future events.

FIG. 6 also shows how events could be separated into different event quality groups based on their projected total revenue. Thus, games can be divided into different quality groupings based on their projected revenue (or premium or discount). Events with the highest quality (i.e., highest potential revenues) will be those to the right of the right vertical dashed line while those with the lowest quality (i.e., lowest potential revenues) will be to the left of the left vertical dashed line. Events of intermediate quality will fall in between the vertical dashed lines. Using this technique, all events can be grouped into some number of quality bands where the number of quality groups is typically between two and ten and more preferably between three and five.

Once the game quality or potential revenue for a series of games is known, it is possible to group games into packages or to accurately price the full season. High quality events can be bundled with lower quality events and sold together in order to promote sales or lower quality (i.e., lower demand) events. Specifically, a package or season ticket may be determined to be fairly priced when the sum of the premiums for the games is substantially near zero. For example, one can combine an event trading at a 25% premium with one trading at a 25% discount so that the resulting package has a value equivalent to the original ticket price. Of course, it may be desirable to offer a customer a discount for committing to a package of multiple games so the sum of the premium for all games may be chosen to be slightly negative. As the number of the games in the package decreases, the discount (i.e. the sum of premiums) should approach zero.

Accordingly, secondary market data can be used to price tickets, or the data can be used to bundle tickets. Both methods can be used together as well to help increase revenue collected in the primary market.

(3) Pricing Sections, Rows, or Seats

Once a user has an idea of the proper price levels to be used for tickets (whether or not the user used the approaches described above), the user is then ready to create a price plan for the event.

An embodiment can be used to create a price plan. The embodiment can include downloaded or entered information about the venue in which the event will be held.

Software can allow the user to assign prices to seats by creating a certain number of 'price codes' or price levels that relate to dollar values. The software extracts seat information from a venue map, the user is prompted to assign price codes to sections, rows or seat blocks within a row, and the dollar value for the price code is associated with the specific location information. The dollar value of a price code can be changed centrally, and such changes will update the price for every seat identified as being part of that price code. The user can also set a price code to 'kill' (i.e., indicate that a particular location is not for sale) while retaining its dollar value. For example, seats with obstructed views can be color coded or X'ed out so that it is immediately clear to the user that the seats should not be listed for sale. The user may also indicate that certain seats are to be 'held' (i.e., hold them from an initial sale period). The user can preview a visual representation of the pricing plan to make sure that the locations by price and the overall financial potential of all tickets (if sold) meet the needs of those involved with the event.

The user can export the price plan's price codes and seat block assignments to a spreadsheet, such as a Comma-Separated Variable (CSV) file, to be imported into a ticketing system. If the pricing system is directly linked to the ticketing system, then the pricing information can be directly submitted to the ticketing database. The user can create several 'price plans' for an event by assigning them different names and can also share the plans via email or by printing the venue map associated with the different price plans.

An embodiment includes software that incorporates a seat level map for the venue where an event will take place. This software includes a descriptor for each seat in the venue comprised of variables that uniquely identify that location (e.g., section, row, and seat number). The software also includes a means for ascribing a price to each of the seats. The software integrates this information with seat map software and renders a drawing of the proposed seating map by price along with the economics of the pricing for the venue or by price levels.

Another embodiment includes a system and method for correlating current seat inventory information with the venue map. The inventory information may be uploaded or the system may have a direct connection to the inventory database. This allows the inventory to be displayed visually by status (e.g., available, sold, held, killed, inquiry), by price (e.g., the face value of the ticket for a particular seat), and by class (e.g., the type of hold, the type of package associated with the seat).

A database connected to or included in the embodiment can also include the price for each specific ticket. The information from the database can be displayed on a venue map, along with other pertinent information such as total possible revenue, total number of seats at a given price, or total revenue achieved and total remaining potential revenue.

When the display and visualization capabilities are used for planning or inventory control purposes, the seat status information or a data file can be modified, either manually or through software that allows the user to select seats on a seating chart. New information (e.g., price information) about those seats can be input, thereby updating the data file. This allows promoters, venue owners, or other stakeholders a relatively easy to use tool with which to try out different pricing and seating configurations before finalizing pricing for an event.

The display and mapping capability can be accessed through desktop software or through a web-based application. A web-based application can allow users not linked to the ticket data to visualize ticket information. This may be particularly valuable to concert promoters that wish to know about sales status but are not co-located with the ticket database. A web-based system allows users to log in from a remote location, enter a password, and view data. In the case of a user that has access to ticket data, this data is uploaded and the data from the file can be viewed in a number of displays. For a user who does have access to the ticket inventory database, the embodiment will present the last data that was uploaded by someone with access. It is also possible that the system is connected to the inventory database and information is updated automatically. There can also be different levels of access for different password holders, allowing each user access to a predetermined portion of the data.

Figure 7:
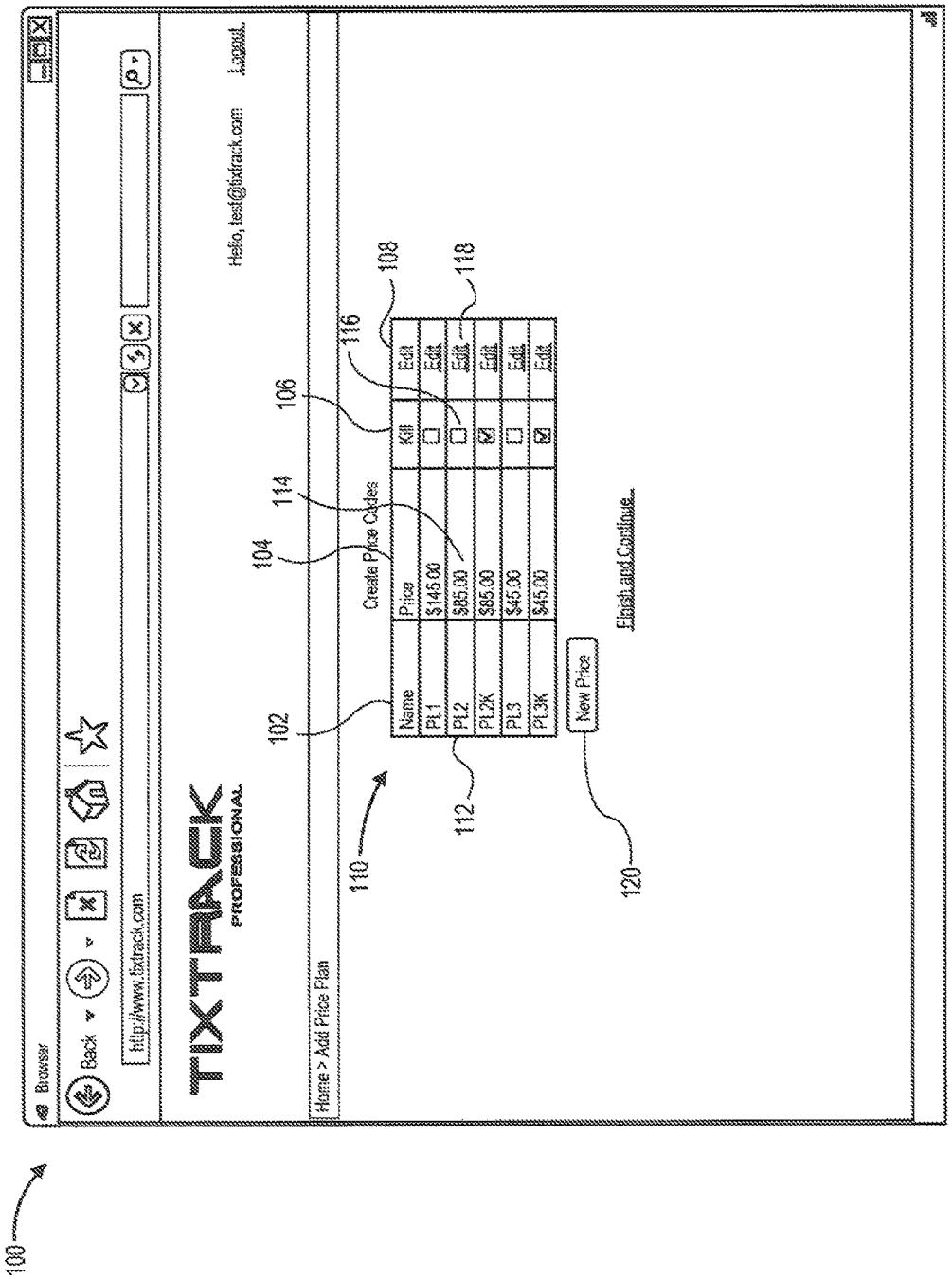
FIG. 7 illustrates a web page for defining price levels in accordance with an embodiment.

FIG. 7 illustrates a web page for defining price levels in accordance with an embodiment. Web page 100 displays price code table 110. Price code table 110 includes price code name column 102, price column 104, kill column 106, and edit link column 108. Price code table 110 includes five price codes (price codes names "PL1" through "PL3K"). The 'K' suffix on the end of a PL price level name indicates that the price code is for killed seats. It may be desirable in some instances to create two price categories with different names but the same price. Once the price categories are determined, each section (or row or seat) is associated with a price category.

Cell 112 indicates the name of the second price code, PL2, and associated cells 114 and 116 display the corresponding price and whether the seat has been killed, respectively. Cell 118 includes a link to another web page to edit the name, price, or kill status of the price level. A new price code can be added by clicking button 120.

Figure 8A:
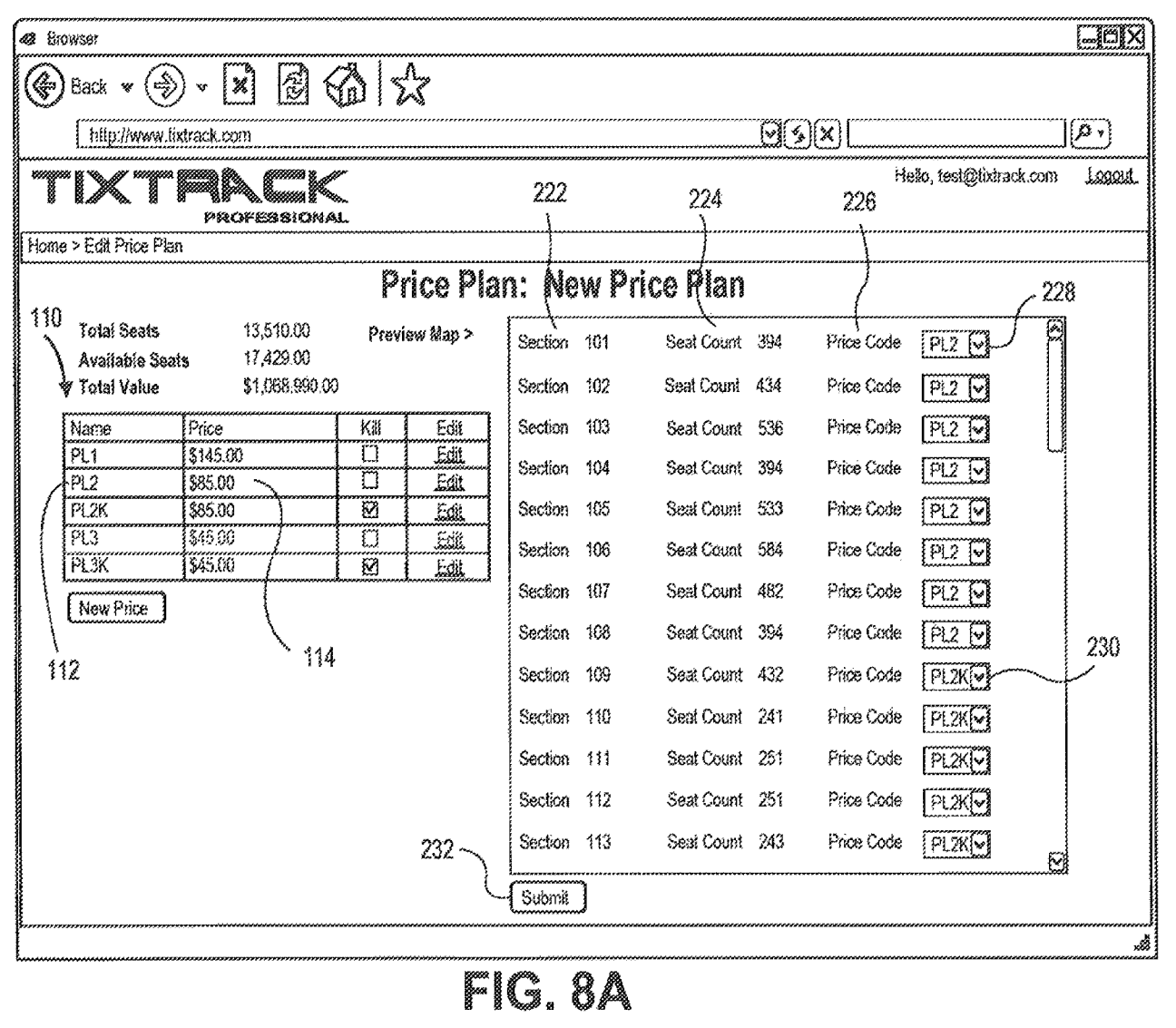

FIG. 8A illustrates a web page for correlating price levels of price codes with groups of seats in accordance with an embodiment. Price code table 110 is reproduced on this web page, including cells 112 and 114 showing the name and price for price code PL2. Another table on the web page shows section column 222, seat count column 224, and price code correlation column 226. Using dropdown listbox 228, seats in Section 101 of the venue, having a seat count of 394 seats, is assigned price level PL2 (i.e., $85.00). Similarly using dropdown listbox 230, seats in Section 109 are assigned price level PL2K (i.e., $85.00 but not for sale). Changes can be submitted to the server by pressing button 232.

Figure 8B:
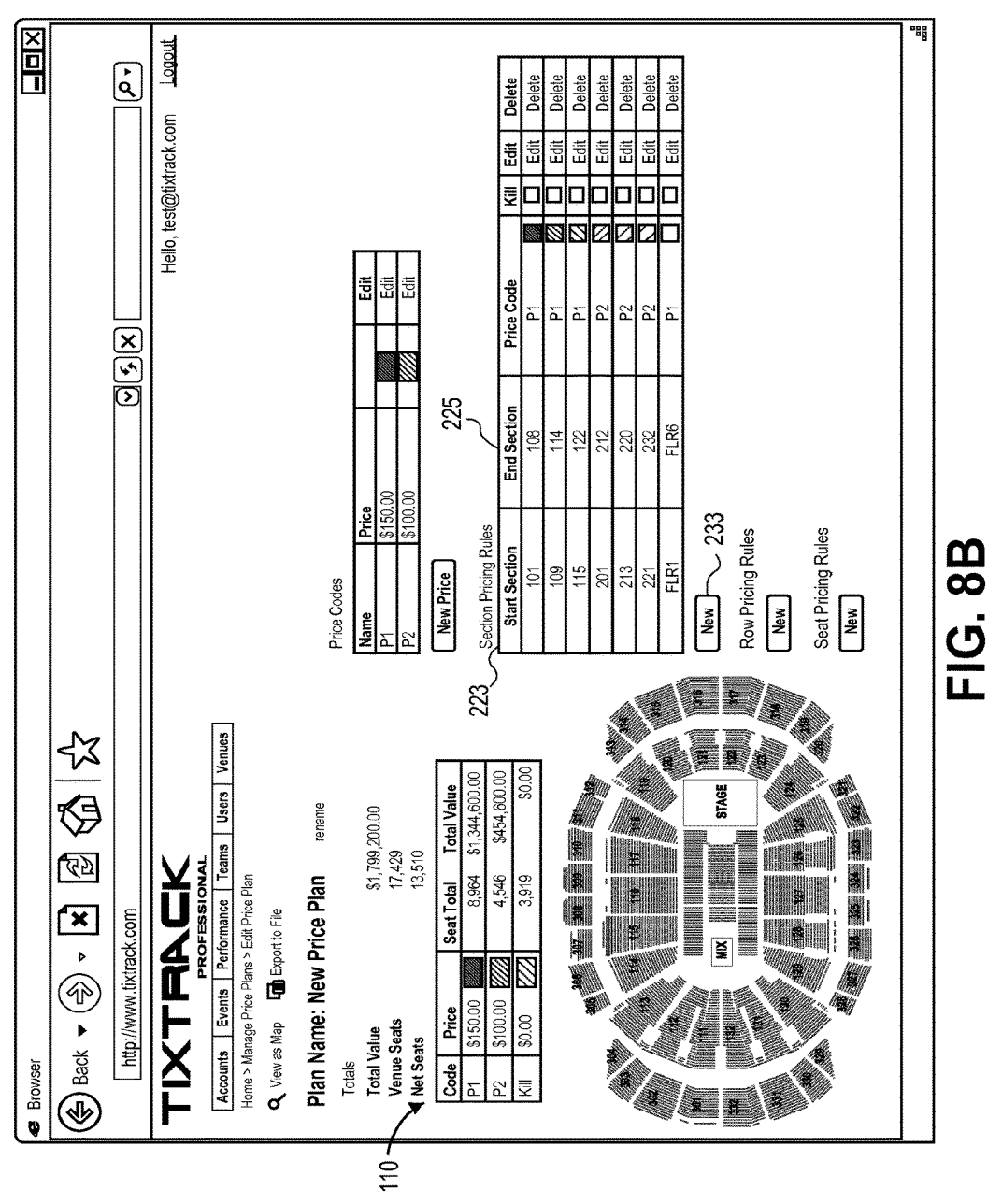

FIG. 8B illustrates a web page for correlating price levels with groups of seats in accordance with an alternate embodiment. Price code table 110 is shown with alternate price codes than those in FIG. 8A. Another table shows start section column 223 and end section column 225. Using these columns, a user can specify rules for the correlation of price codes or levels to particular sections. For example, section 101 through section 108 are assigned price code "P1," and sections 109 through 114 are assigned price code "P1" and can be selected as killed. New rules for assigning sections can be input by pressing button 233. Similar to that for sections, rows and individual seats can also have rules for assigning price codes. For example, a rule that individual seats beyond ±95° of the front of center stage are automatically killed can be input by a user so that those seats are not sold.

Rules can also correspond to portions of the venue map. For example, a user might use a mouse to draw an electronic line arcing down between sections 113 and 114, behind the mixing platform, and then between sections 129 and 130 (see venue map at lower left of FIG. 8B). The user could then designate that all sections behind this line be a certain reduced price. In a different embodiment, an performance artist could use a light pencil or signature pad to draw his or her own special symbol across a swath of seats on the venue map, so as to price the seats within the swath at a discount. This price discount method could be used to help market the event as well as build brand awareness for the artist's special symbol. In another embodiment, the seats within the artist's symbol or mark could be priced at a premium instead of at a reduced price. A concert-goer might be enticed to pay slightly more for a ticket to sit in the 'point' of the artist's exclamation point or the dot of her signature 'i.'

Figure 9:
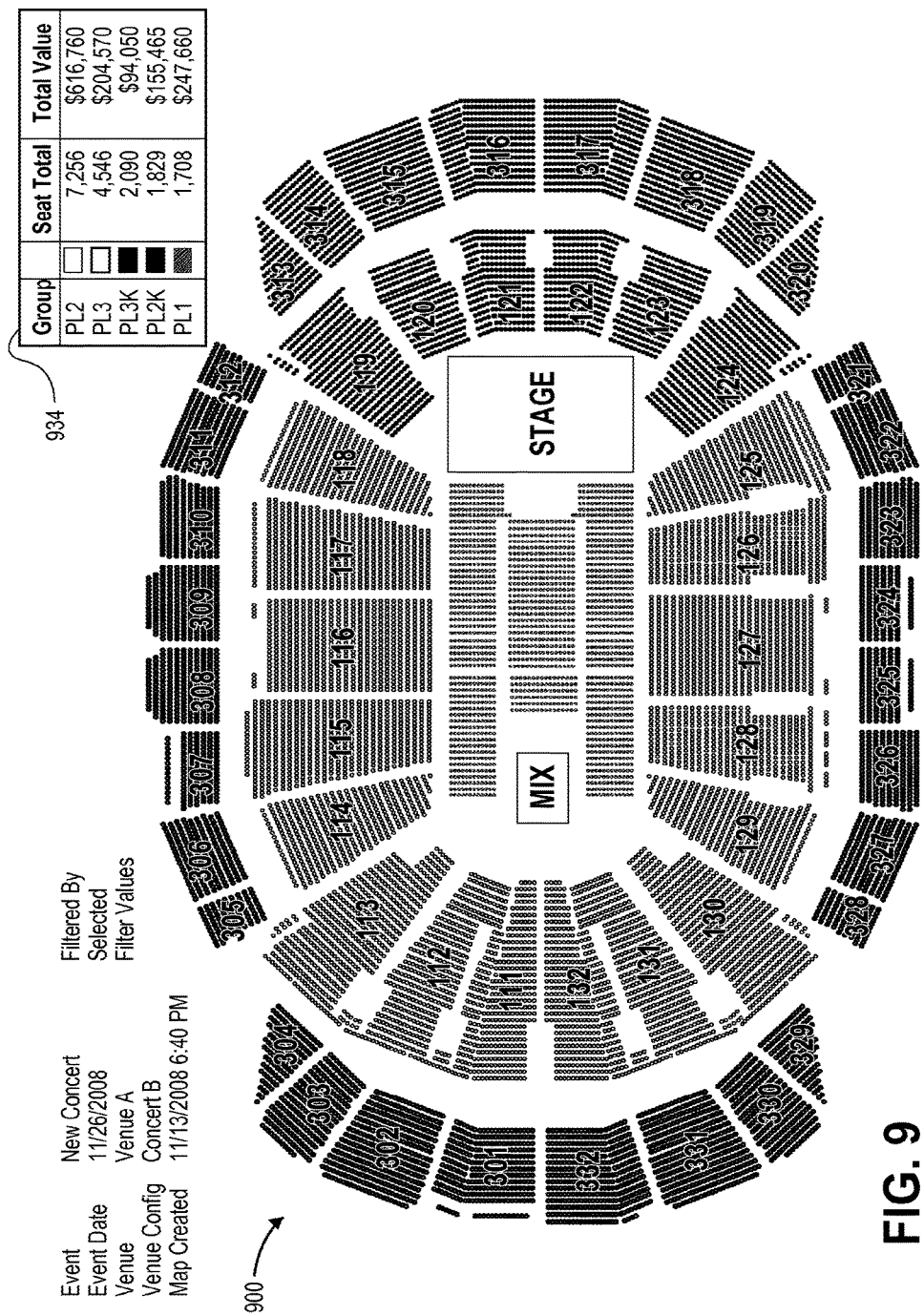
FIG. 9 illustrates a venue map showing price levels correlated with seats in FIG. 8A in accordance with an embodiment.

FIG. 9 illustrates a venue map with correlated price levels from FIG. 8A. Upon submission of the correlated price levels, venue map 900 is displayed on a separate web page. Venue map 900 shows the price levels correlated with seats. Legend 934 indicates to a user what price levels correspond to what graphics.

In certain instances, a price code can be a 'flex price.' A flex price indicates that more than one price level is assigned to a price code. For example, a 'flex up' price and a 'flex down' price can be input so that one or the other flex price can be selected during an on-sale event, depending on demand or sales velocity.

For some ticket vendor software, such as Ticketmaster® ticket sales software, tickets cannot be re-priced during a sale, and new tickets cannot be added without stopping the sale to the public. For this and other reasons, it is sometimes helpful to assign multiple prices (e.g., flex prices) for to the same seat before the sale. In this way, a user can determine demand based on early sales data and then select one pre-entered price that best matches this demand without halting all sales.

Figure 10A:
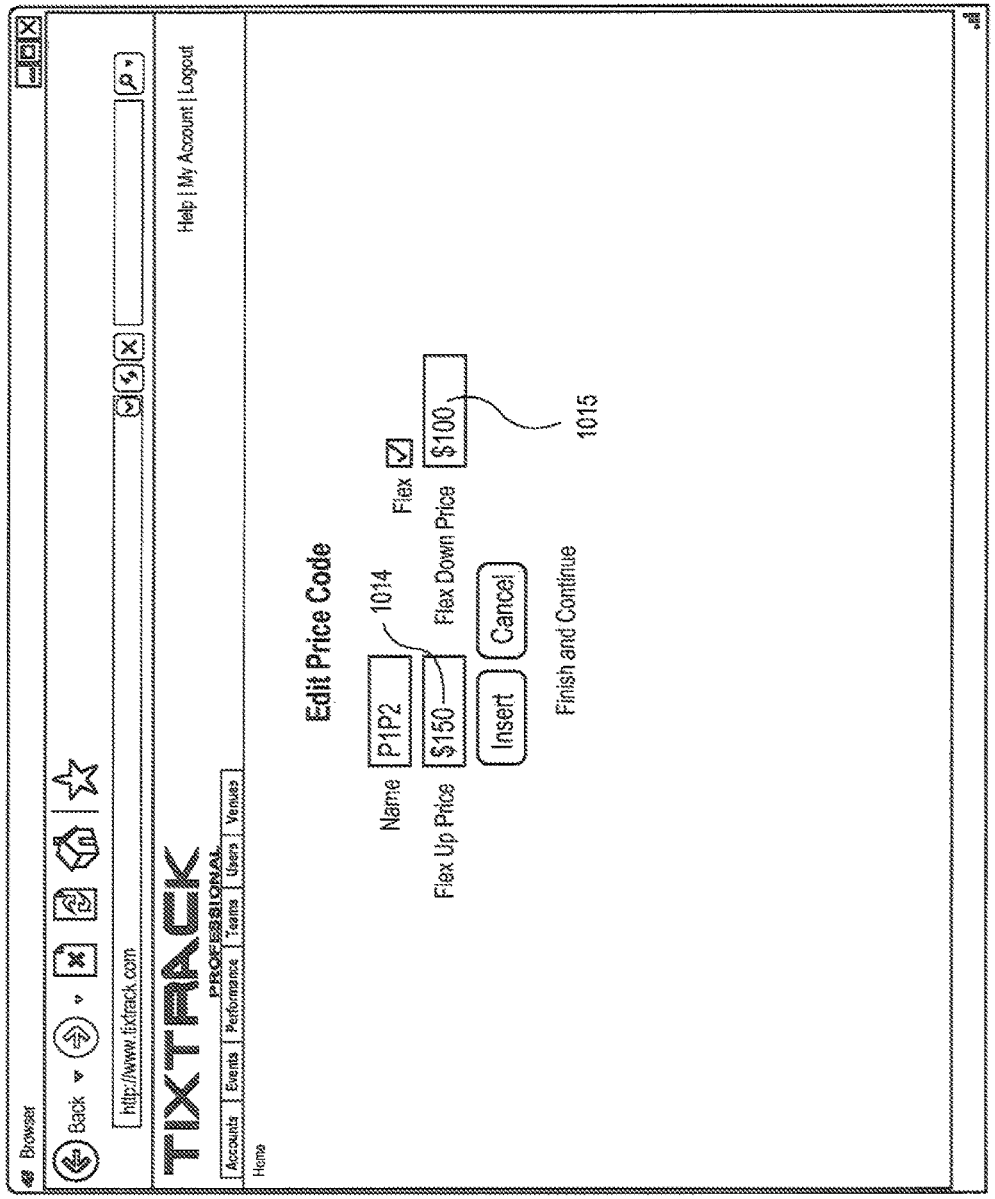
FIG. 10A illustrates a web page for editing price codes in accordance with an embodiment.

FIG. 10A illustrates a web page for establishing a price code for flex categories during pricing according to an embodiment. When editing a price code, a user may check a flex checkbox in order to enable or make visible textboxes for entry of flex prices. In the exemplary embodiment, two currency input textboxes are shown: one for a 'flex up' price, and one for a 'flex down' price. More than two input textboxes can be shown for multiple flex levels. Flex up price level 1014 (i.e., $150) and flex down price level 1015 (i.e., $100) are input by the user and stored in a database. A name indicating that the price code is a flex price code (e.g., "P1P2", "P1Flex") can be entered, although any name can be entered. After the price code is newly added or edited, the user submits the form using a submit or insert button.

Figure 10B:
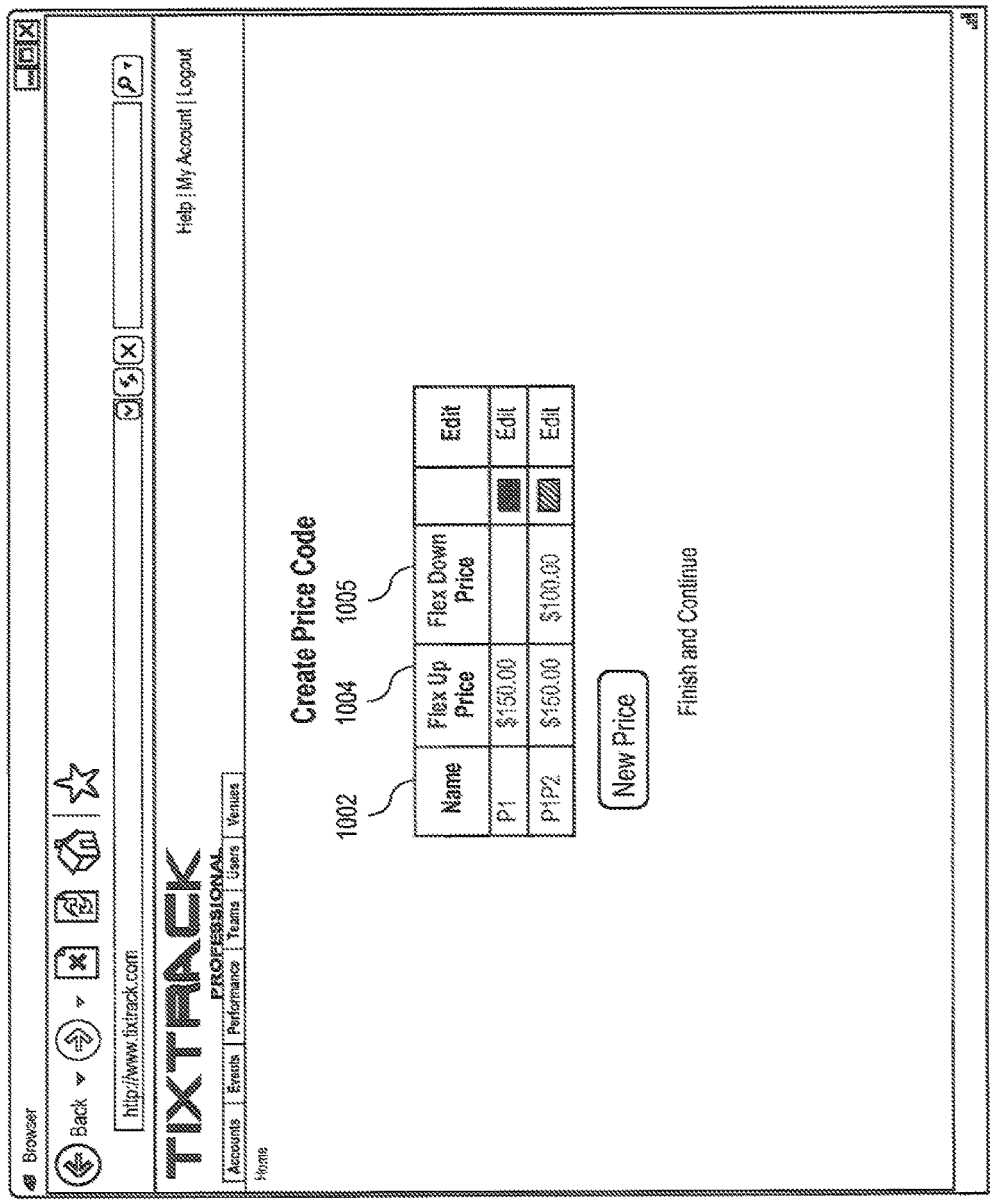
FIG. 10B illustrates a web page for creating price codes in accordance with the embodiment of FIG. 10A.

FIG. 10B illustrates a web page for displaying all of the currently input price codes for an event. Column 1002 of the table indicates the name of each price code. Column 1004 indicates the single price or the flex up price for each price code, and column 1005 indicates a flex down price. A color, hatching, or other indicator can be assigned to each price level. FIG. 10B is similar to FIG. 7 but with a column showing flex down prices. Other columns (not shown) can display more than two flex prices if applicable. More price codes can be added by clicking a new price button.

Figure 10C:
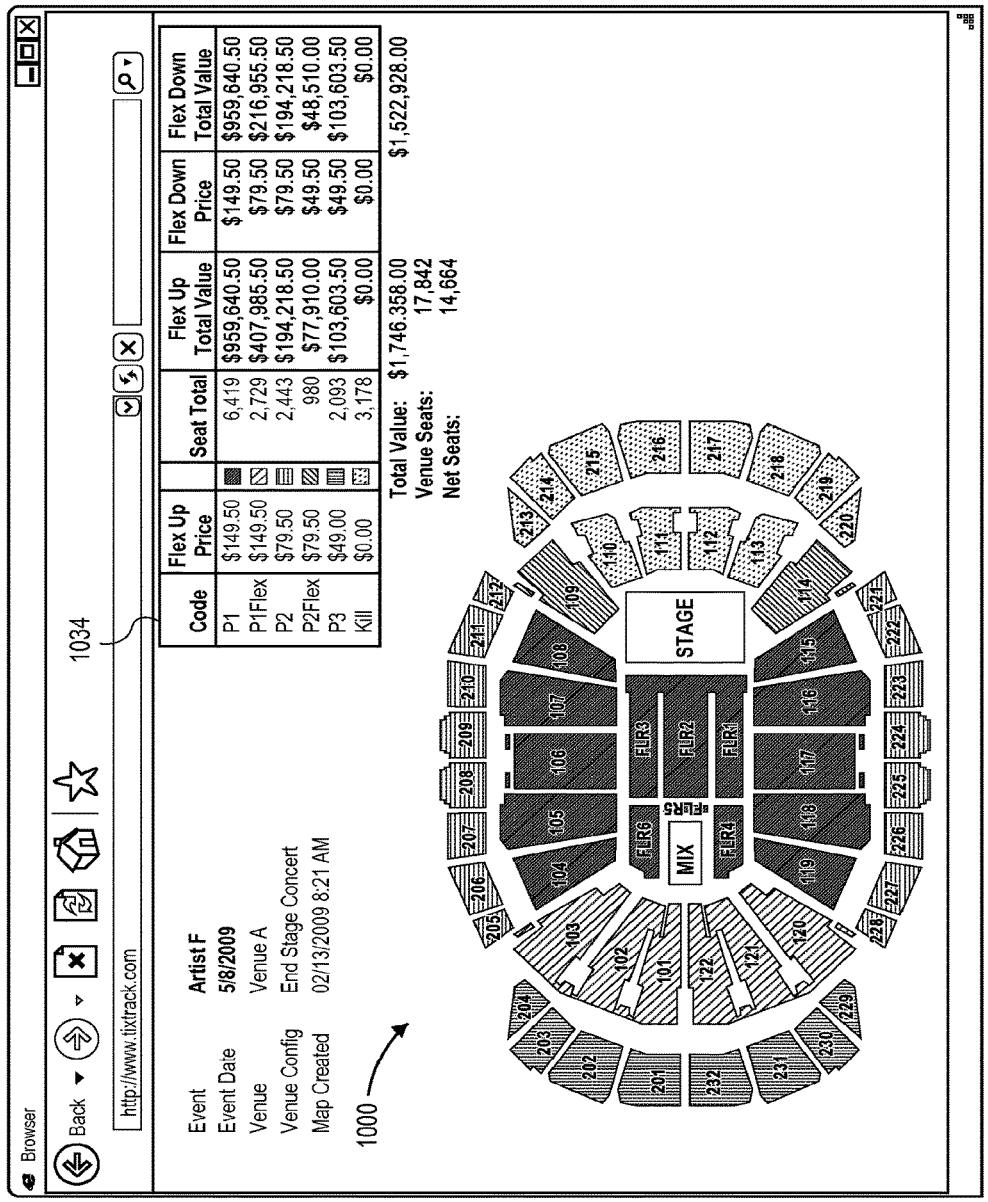
FIG. 10C illustrates a web page for viewing price codes and a related venue map in accordance with the embodiment of FIG. 10A.

FIG. 10C illustrates another web page for displaying all of the currently input price codes for an event juxtaposed with a venue map. Table 1034 displays flex up and flex down prices. In addition, the table shows the total value for seats in each price code. Price codes with different flex up and flex down prices show different total values. Price codes with the same prices for flex up and flex down (i.e., non-flex price codes) show the same total values in the flex up and flex down total values.

The venue map in the figure shows different seat sections with hatching indicating the corresponding price level. Other embodiments can show colors or other indications of the price code down to the seat level.

Figure 11:
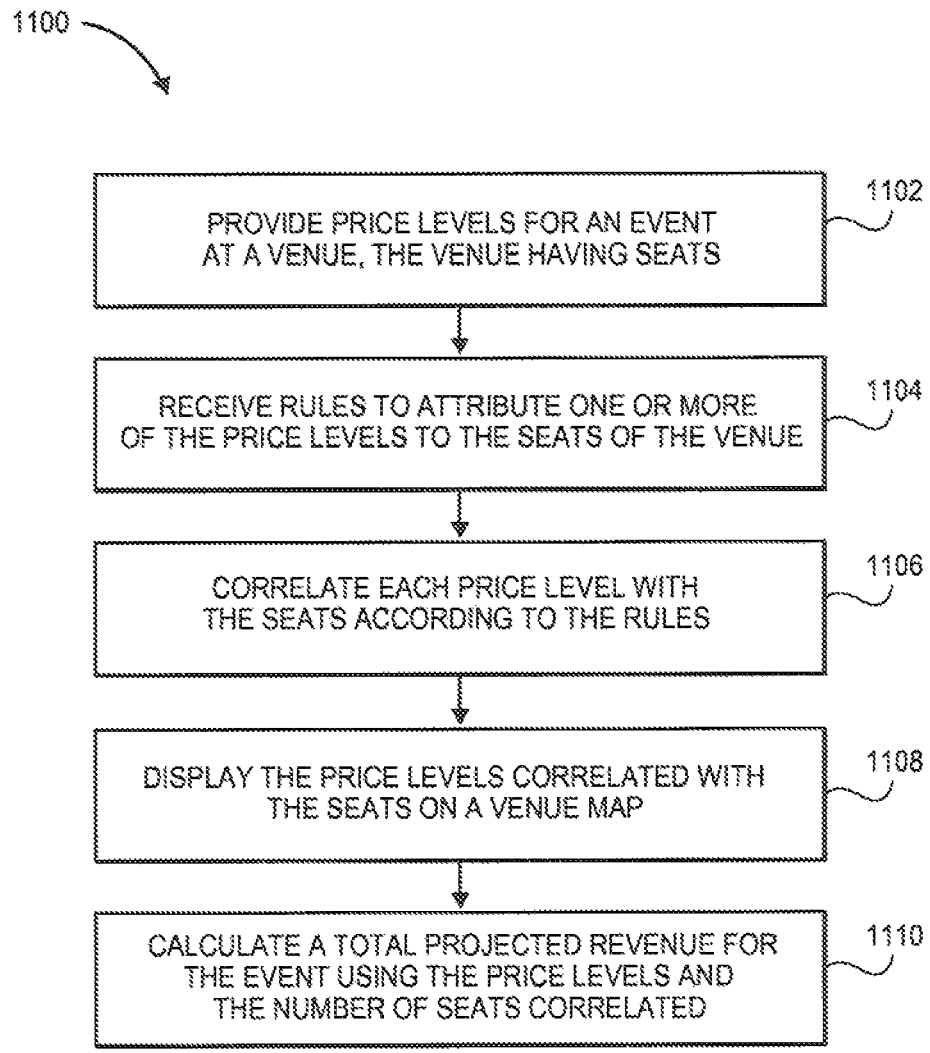
FIG. 11 is a flowchart with operations in accordance with an embodiment.

FIG. 11 is an example flowchart illustrating a process in accordance with one embodiment. In operation 1102, price levels are provided for an event at a venue. In operation 1104, rules to attribute one or more of the price levels to the seats of the venue are received. In operation 1106, each price level is correlated with the seats according to the rules. In operation 1108, the price levels are displayed correlated with the seats on a venue map. In operation 1110, a total projected revenue for the event is calculated using the price levels. The number of seats correlated are also used to calculate the total projected revenue.

Price planning software can be used to visualize and edit pricing conveniently and intuitively. Electronic venue maps, displaying data down to the seat level, can help promoters, venue representatives, and other stakeholders design price plans efficiently.

(4) Event Tracking

After the planning stage, the seats are set for sale. During the "on sale," tickets can be bought up extremely quickly by fans or other distributors. The first few hours or even minutes of an on-sale can be a dynamic confluence of pent-up demand and immediate supply.

A promoter, venue representative, or other stakeholder may wish to watch in real time the sale as it progresses. Some embodiments allow such access on the same screens as indicated above.

Venue maps can allow a user to see all of the current inventory and immediately distinguish by color, or gray shade, seats that are sold, those that are on hold, and those that are not for sale. In addition, hovering a mouse cursor or other electronic pointer over a seat graphic in the venue map can reveal additional information about the seat status, such as the type of hold or selling price of the seat.

Not only can one view information, but the visualization graphics can also be used during the sale of tickets for inventory control purposes. In this instance, it may be beneficial to display additional information along with the venue map or diagram. Such information can include the revenue that a specific venue can generate given a current pricing structure, the remaining revenue possible from unsold seats, and the amount of revenue that is not accessible due to seats on hold or that are not for sale.

One embodiment includes a software system and method for storing and comparing inventory status at different points in time. The system allows the user to create a map of the inventory status at different times or to display a map that compares the changes that have occurred between two or more points in time. This venue map can also be augmented with other graphical information about sales as a function of time, which can include the number of seats sold at each time interval in total or by price, status, or class, the amount of revenue associated with tickets sold at each time interval in total or by price, status, or class, or other time dependent information.

The embodiment can also save inventory information to a history page. Every time the user uploads a new inventory data file or the system accesses inventory data from a database, the system saves that data to a history file. The user has the ability to go to the history, select the file, and build a map based upon the data in the file. The data from the history files can also be compared to each other. This can yield a new map that displays inventory changes between the two files or can be shown in graphical form such as total revenue as a function of time.

The embodiment can integrate inventory information from the history file to form a movie. This movie may be stored and played back as a time-lapse movie (or through high-speed photography techniques) for analysis. By viewing how the seats fill, one can determine whether the seats fill 'back to front' or 'front to back.' If the seats fill front to back, then higher priced seats in the front may not have high enough prices in relation to lower priced seats in the back. Conversely, if the seats fill back to front, then higher priced seats in the front may have too high a price in relation to lower priced seats in the back. One can also assess 'side to middle' and other geographical seating preferences using the updating. Effectively, the combined interests of individual ticket purchasers are used to inform the viewer of the relative quality of seats. Taking a snapshot of seat statuses at the beginning and end can fail to give this type of insight.

Furthermore, watching the fill patterns of the venue's seating can inform a viewer of eccentricities of the venue. For example, if one side of the venue fills faster than the other side, it could mean that the first side of the venue is more convenient to certain types of transportation, bars and clubs, or other external influences. Also, such fill patterns may indicate hidden consumer preferences with respect to restroom locations, concession stands, and air conditioning. This can avoid the expense and inaccuracies of customer surveys, focus groups, and other social data gathering techniques which are sometimes ineffective.

Figure 12A:
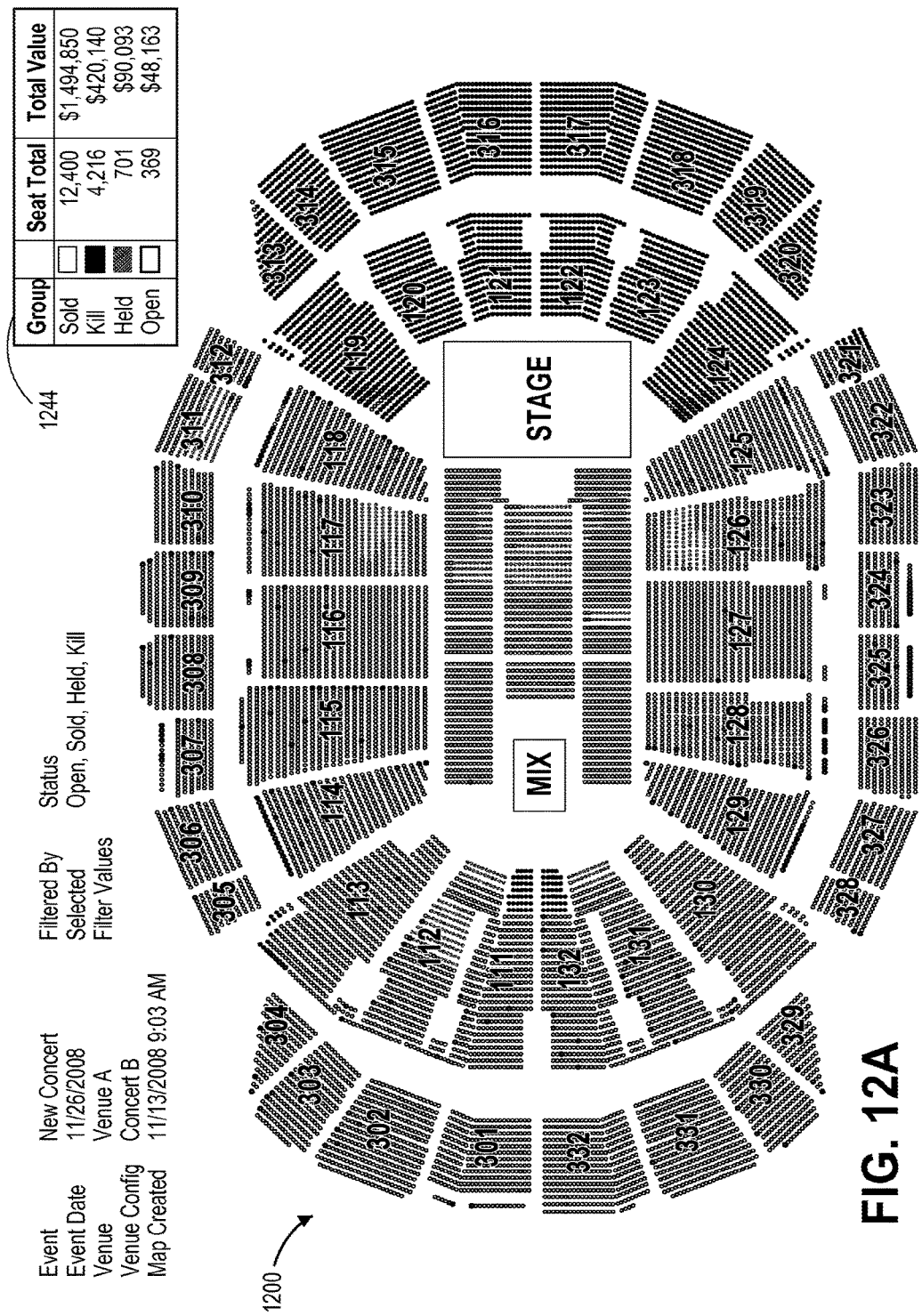
FIG. 12A illustrates a venue map showing statuses of inventories of seats in accordance with an embodiment.

FIG. 12A illustrates venue map 1200 with seat statuses during a sale of tickets for an event. Legend 1244 indicates seats that are sold, killed, held, or open. Venue map 1200 shows detail down to individual seats that are sold. This map shows all seats based on their status (open, sold, held, killed) and shows the financial totals for each category (i.e., by summing the number of seats sold at their respective price, the total dollar value of the sold seats is calculated).

Figure 12B:
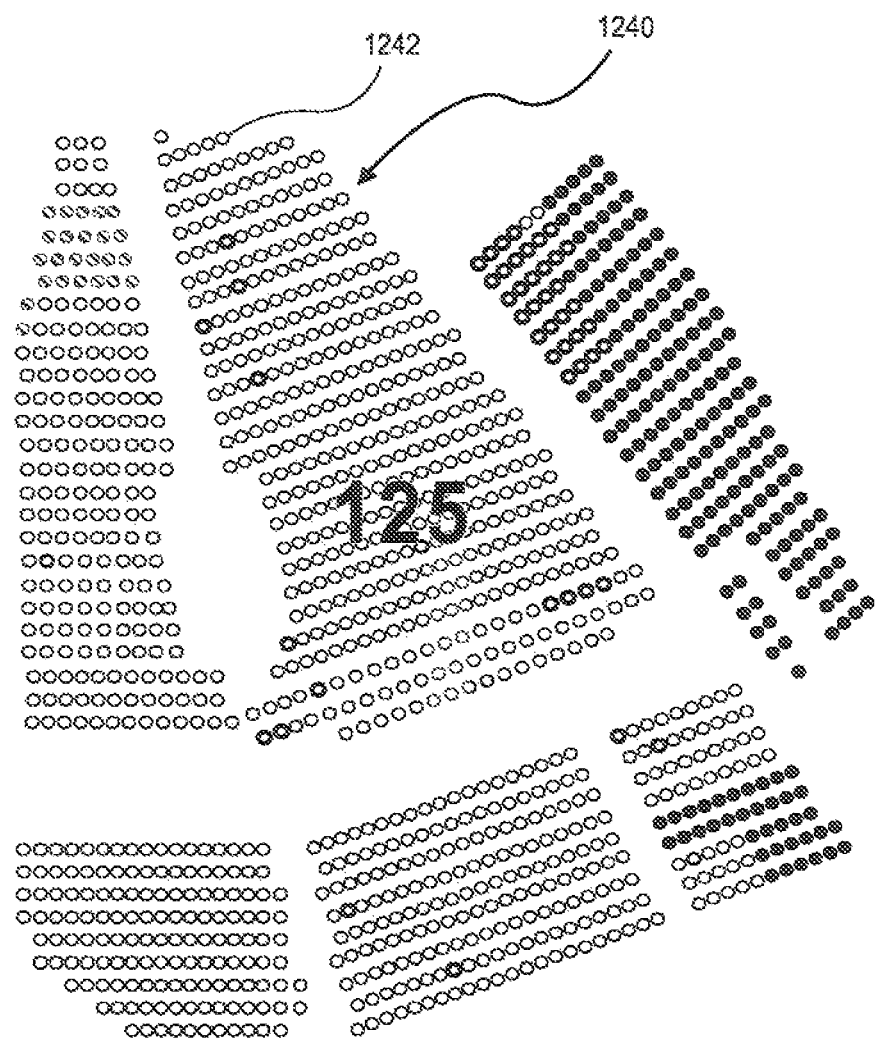
FIG. 12B illustrates an enlarged view of a portion of FIG. 12A.

FIG. 12B illustrates an enlarged portion of region 1240 (section 125 and the surrounding area of FIG. 12A). The status of each seat can be displayed. For example, seat 1242 is displayed as sold. Four rows back, a single seat in the row is still unsold (depicted in this case as a circle with a darker border but could also be based on fill color, shape, or other attribute). Several other single point unsold seats are shown in the section. The unsold seats can indicate problems in bundling seats for sale. Determining in a section the density of single unsold seats, which are less likely to sell than two or more seats, can help a marketing team estimate the overall density of single unsold seats for future events.

A venue map can also show other statuses of seats, such as whether potential buyers have inquired to purchase a seat.

Figure 12C:
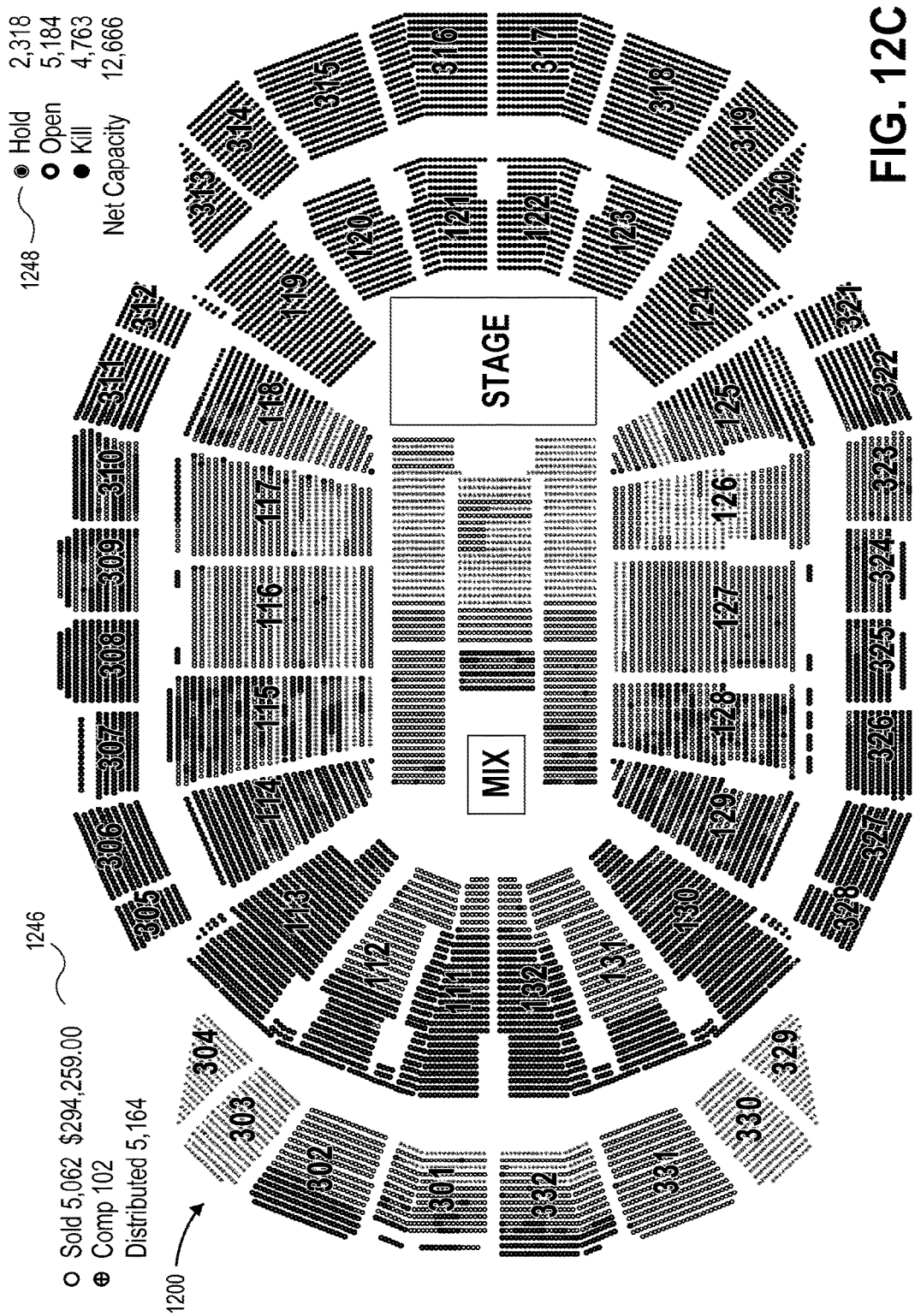
FIG. 12C illustrates the venue map of FIG. 12A updated with statuses of inventories of seats in accordance with an embodiment.

FIG. 12C illustrates the venue map 1200 with seat statuses during a sale of tickets for an event. Table 1246 shows calculated revenue for the event from the number and price levels of the sold seats. Legend 1248 summarizes the number of held, open, and killed seats in the venue.

Figure 12D:
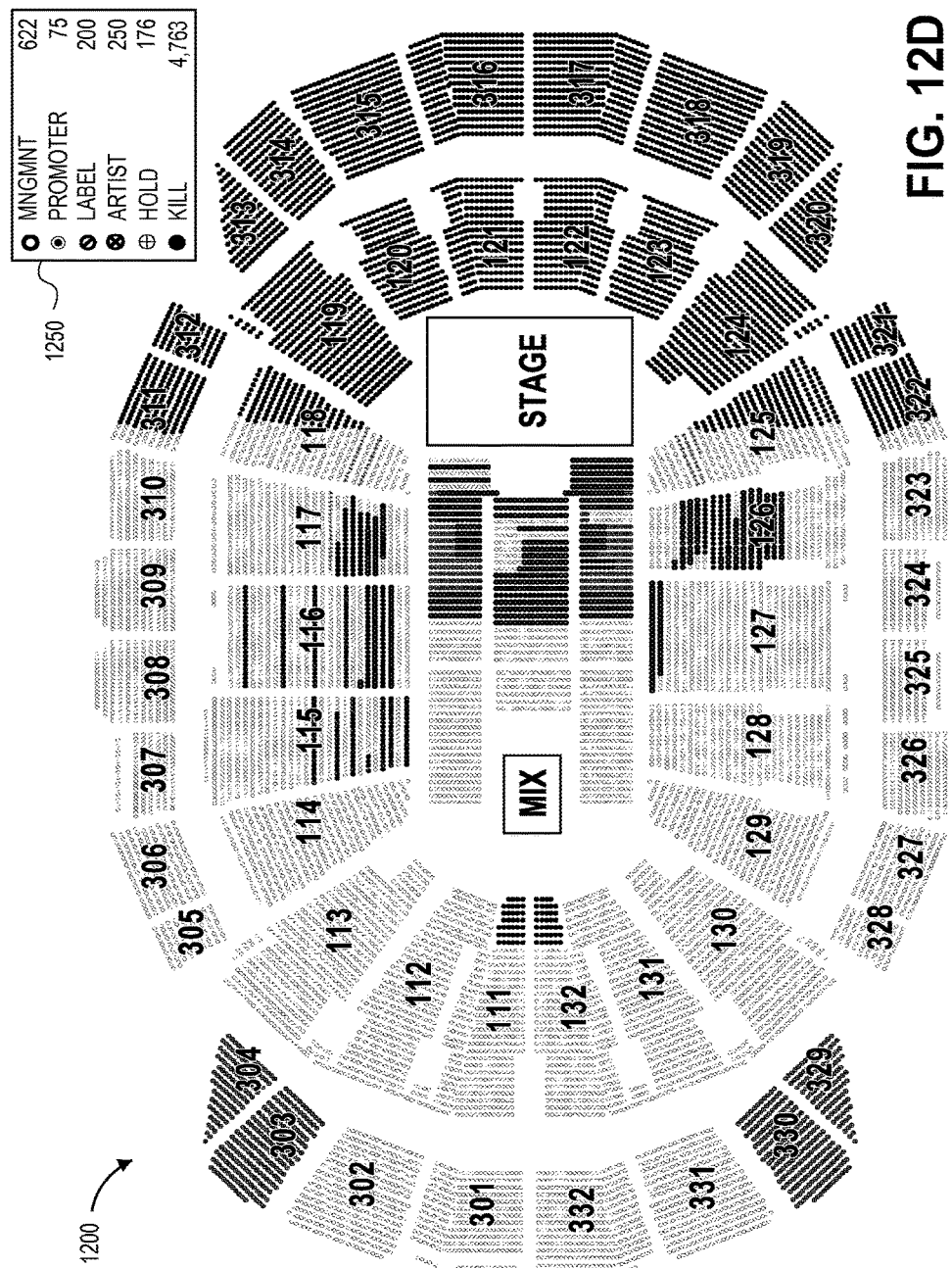
FIG. 12D illustrates the venue map of FIG. 12A showing allocations of inventories of seats in accordance with an embodiment.

FIG. 12D illustrates a venue map which may be used to show the status of seats which are reserved for management, the promoter, record label, and the artist him or herself. Other types of holds may also exist and be labeled with specific or more general information. Color coding can be employed so that more categories of stakeholders can be displayed in the legend and on the venue map. While holds may be created before an event goes on sale, the status of holds can change during the course of an event as seats are released for sale or new seats are held.

Figure 13:
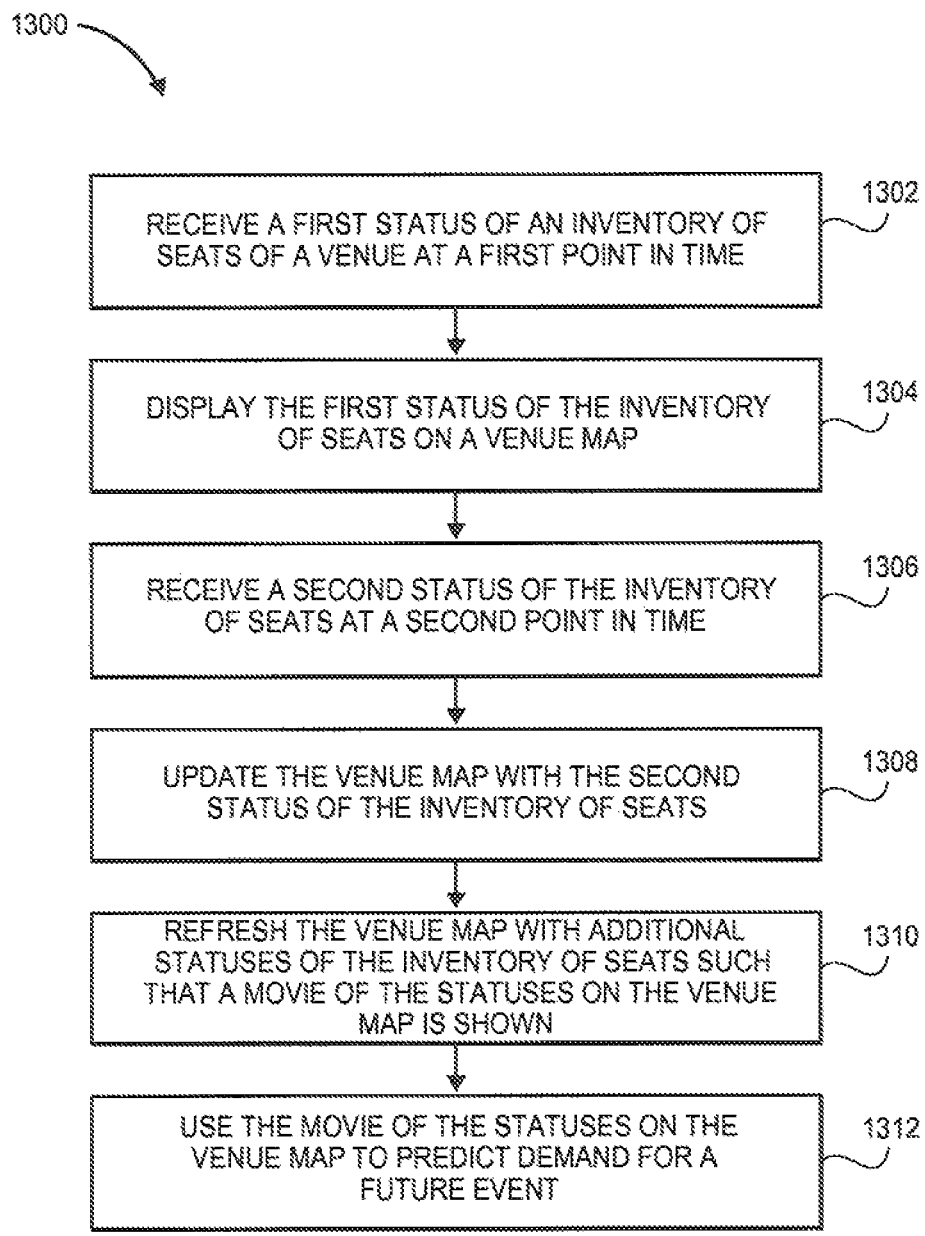
FIG. 13 is a flowchart with operations in accordance with another embodiment.

FIG. 13 shows an example flowchart illustrating a process in accordance with another embodiment. In operation 1302, a first status of an inventory of seats of a venue at a first point in time is received. In operation 1304, the first status of the inventory of seats is displayed on a venue map. In operation 1306, a second status of the inventory of seats at a second point in time is received. In operation 1308, the venue map is updated with the second status of the inventory of seats. In operation 1310, the venue map is refreshed with additional statuses of the inventory of seats. Accordingly, a movie of the statuses is shown on the venue map. In operation 1312, the movie of the statuses on the venue map is used to predict demand for a future event. For example, back-to-front buying of a past event can indicate that a future event will have similar back-to-front demand for seats. Pricing for the back seats can be raised accordingly to even out the demand.

Seat sales can also be visualized in other ways. For example, the number of tickets sold can be plotted on line, bar, or similar charts with respect to time. Charts are not limited to tickets sold but could involve the number of inquiries, etc. Also, charts can be created for subsets of tickets, such as tickets in a certain price level. The user can also select the time frame over which the inventory data should be plotted. Using such charts, a user can determine if a radio advertisement resulted in a bump up in ticket sales. Other factors can also be correlated with ticket sales.

Figure 14:
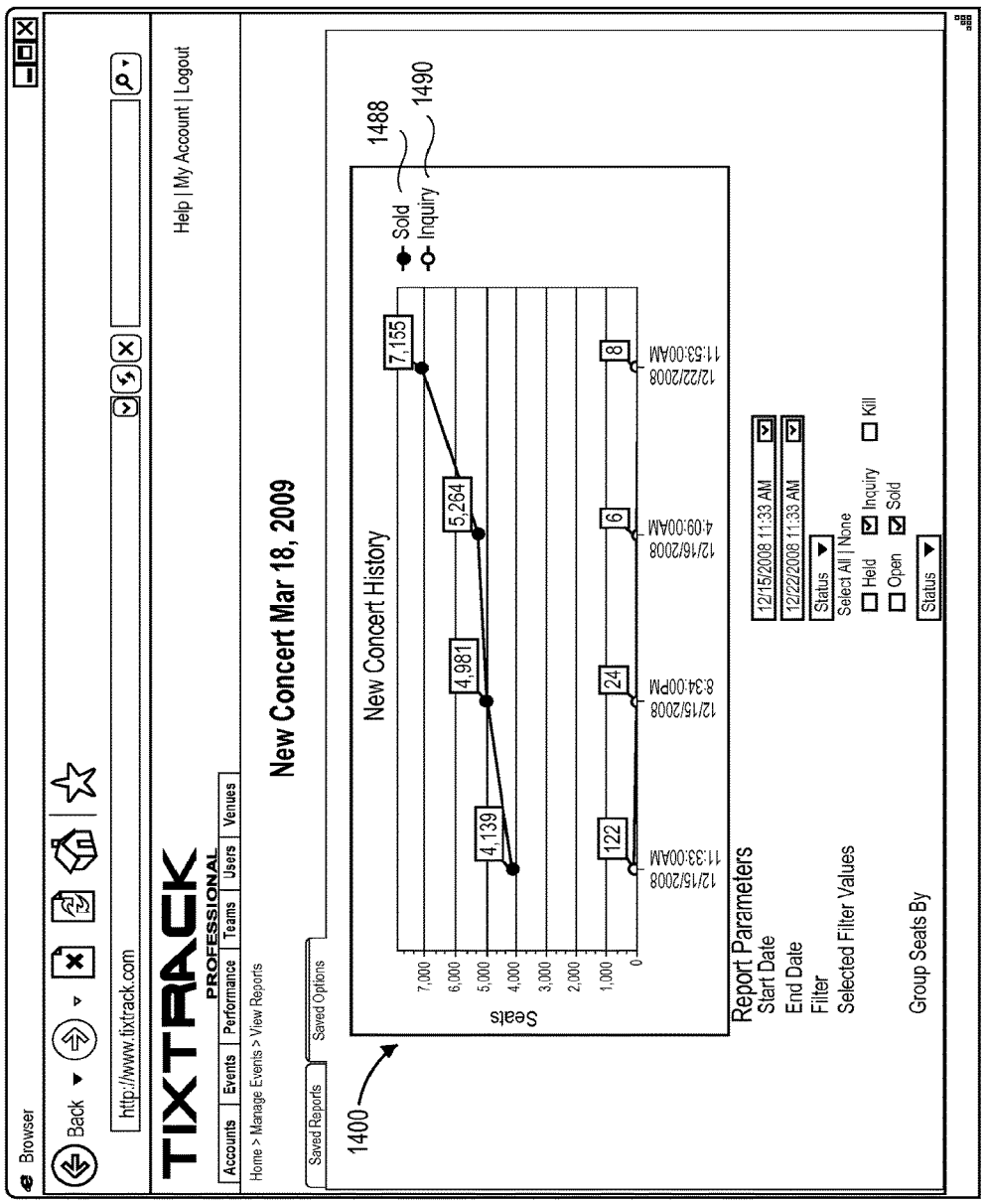
FIG. 14 is a plot of tickets sold and inquiries with respect to time in accordance with one embodiment of the present invention.

FIG. 14 is a plot of total tickets sold and inquiries with respect to time in accordance with one embodiment of the present invention. In an embodiment, sold tickets 1488 can be shown with inquiries for tickets 1490 as shown. Other ticket statuses can also be plotted, such as those for held, open, and killed seats.

Watching ticket sales as they progress or plotting sales by time can help a promoter, venue representative, or other stakeholder determine marketing techniques that are working and better estimate demand. However, one can also use the data to act upon the information in real time to maximize revenue for an event.

(5) Changing Prices or Distribution Channel

As described above, it is preferred that flex price levels be selected prior to an event. Price codes can be assigned multiple price levels. For example, a price code for a group of seats can include a 'flex up' price level of $150 and a 'flex down' price level of $120. The two price levels may correspond with prices in other, non-flex price codes. For example, price code "P1/P2" may have a flex up price level equal to that of price code "P1" (e.g., $150) and a flex down level equal to that of price code "P2" (e.g., $120). If one can predict demand for an event, one can use the predicted demand to properly choose to 'flex up' or 'flex down.'

During a sale of tickets, it has been found that the first few minutes of sales can be used to predict demand for later on in the same sale. Such real-time predictions may be based on a power model, exponential gamma model, or other suitable models as will be described.

One embodiment includes systems and methods for determining ticket demand during an on-sale event then allow a user to adjust sales techniques during the on-sale in response to the demand. This includes software that automatically predicts the number of tickets that will sell either in total or by price level. The software can then recommend to the user that certain tickets are moved from one status to another (i.e., flexed from a lower price level to a higher price level or vice versa). In some instances, the software will automatically re-price inventory without user involvement. Because sales can move rapidly, sometimes automatic re-pricing is preferred.

The system can also be used for predicting the number of ticket sales for single events, such as a concert on a specific date. Both long term sales (e.g., sales over a period of weeks ending in the event) and short term sales (e.g., minute by minute sales starting from the on-sale time of the event) can be considered. Projecting total sales by price level allows for seats to be priced at the appropriate level once demand is better understood. This flex pricing allows for tickets to be sold at the highest possible price based on demand. The system can also determine if the event will sell out, either in total or by price category.

Several probabilistic models for the ticket sales modeling are characterized by having different hazard functions. The hazard function is used to determine the duration dependence of ticket sales. Duration dependence is the relationship between time passing and an increased or decreased likelihood of incremental purchases. Depending upon the hazard function, its shape can take several different forms.

Monotonic curves either decrease or increase throughout their duration. A monotonic curve in this application would suggest that the likelihood of purchasing a ticket is either decreasing or increasing over time. The decreasing monotonic curve is appropriate for the short term on-sale modeling. Non-monotonic curves, although more complex, may be appropriate for long term modeling. A U-shaped hazard function can be used where there is an initial rush to secure seats at an event, followed by a lull in sales, and a second rush just before the event date.

A simple model for the sale of seats is the exponential model which is given by the equation:

$$S = A(1 - e^{-\lambda t}) \quad \text{(Eqn. 2)}$$

where S is the cumulative ticket sales, A is a constant, $\lambda$ is a constant, and t is time from the start of sales. This model has a constant hazard function of $\lambda$ and asymptotes to the value of A. Parameters for this simple exponential model can be simply estimated by fitting a least squares straight line to a logarithmic plot of the data.

The simple exponential model's assumption of constant hazard rate is not realistic for many situations. In sales of sporting event and other tickets, the initial sales rate rapidly drops. To accommodate this, a power model can be used, which is given by the following equation:

$$S = A t^\alpha \quad \text{(Eqn. 3)}$$

where S is the cumulative ticket sales, A is a constant, t is the time from the start of sales, and $\alpha$ is a constant. This model has a hazard function which is linear. The function asymptotes to infinity. Parameters can be simply estimated by fitting a least squares straight line to a logarithmic plot of the data.

Figure 15:
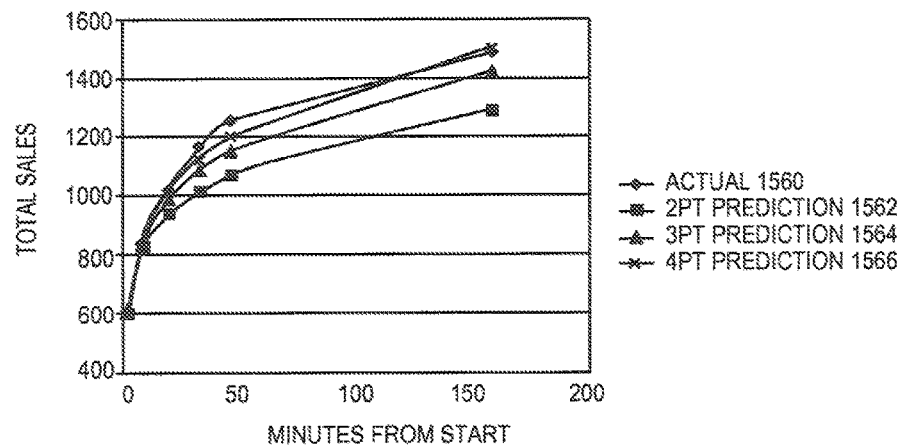
FIG. 15 is a plot of total ticket sales for an event versus time.

In FIG. 15 the actual number of tickets sold 1560 for an event is plotted with respect to time in comparison with a power model, the power model fit to two, three, and four data points. In this example, data points are available at 0, 9, 20, 34, 47, and 161 minutes after on-sale. In the exemplary case, two-point prediction 1562 and three-point prediction 1564 extrapolate to lower ticket sales than there actually ended up being; however, four-point prediction 1566, using the data points at 0, 9, 20, and 34 minutes, matches well to the actual number of tickets sold 1560 curve after 161 minutes.

Figure 16:
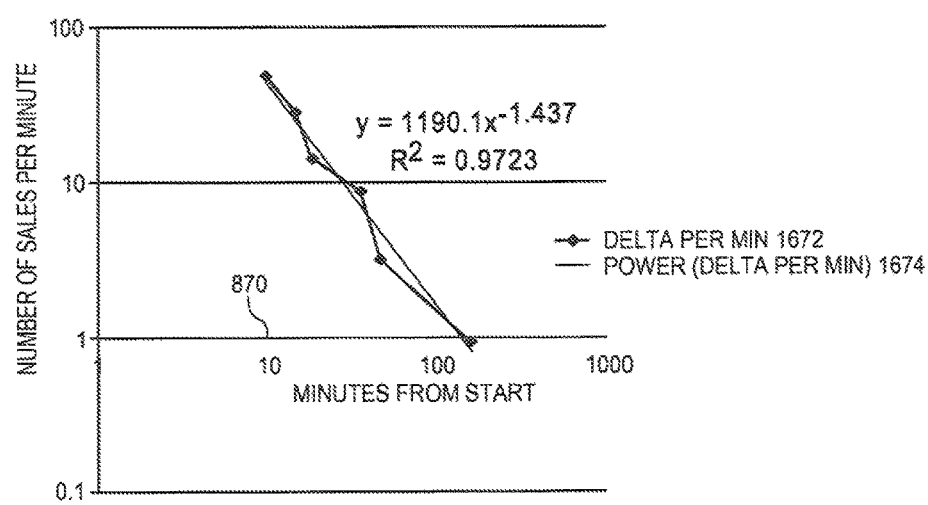
FIG. 16 is a logarithmic plot of ticket sales per minute for an event versus time.

FIG. 16 shows how the sales velocity or rate of ticket sales (i.e., the number of tickets sold per minute or delta per minute) can, for a power model, be estimated by straight line fitting on a logarithmic plot. The log-log plot of rate versus time offers an elegant way to predict the rate of falloff in sales. This can be used to predict when the on-sale can be closed out, i.e., when the rate drops below x sales per minute.

The power model's asymptote at infinity is not altogether realistic, as sales, particularly in the long term, will, of course, asymptote to total seating capacity. Also the linear hazard function is not realistic for long term sales.

The exponential gamma model allows for these characteristics; $\lambda$ is distributed across the population as a gamma distribution. An exponential gamma model is given by the following equation:

$$S = A(1 - (\alpha/(a-t))^\alpha) \quad \text{(Eqn. 4)}$$

where S is the cumulative ticket sales, A is a constant, $\alpha$ is a constant, a is constant, and t is the time from the start of sales.

The hazard function of the exponential gamma model has a decreasing form proportional to $1/t^\alpha$. This is very suitable for events which exhibit negative concave duration dependence, such as on-sales. Parameter estimation can be performed by using standard numerical optimization software. Maximizing the logarithm of the resulting likelihood function has been found to be helpful to obtain the maximum likelihood estimates of the model parameters.

The Weibull-Gamma model is a generalization of the exponential gamma model. The Weibull-Gamma model allows the hazard rate to vary. It is of similar form to the exponential model (described above), except that t is replaced by $t^c$ where c is a constant. The Weibull-Gamma model is given by the following equation:

$$S = A(1 - e^{-\lambda t^c}) \quad \text{(Eqn. 5)}$$

where S is the cumulative ticket sales, A is a constant, $\lambda$ is a constant, t is the time from the start of sales, and c is a constant.

The hazard function of this model is very flexible and can be chosen by varying parameters. Parameter estimation can be performed by using standard numerical optimization software. One can maximize the logarithm of the resulting likelihood function to obtain the maximum likelihood estimates of the model parameters.

In addition to the single models described above, combinations of models can be used, provided enough data is available to accurately estimate parameters. Alternatively, different models can be used at different times in the sale sequence. For example, one model can be used for the on-sale event, one model for long term sales, and another model after an intense marketing campaign.

Calculating how many seats to release at a given 'flex' price can be based on current sales data and other parameters such as number of inquiries. The relevant future point in time to predict is usually a few hours into the on-sale. This time is called prediction time $t_p$, which is preferably set to 3 hours into the on-sale. If the model indicates that tickets sold P at time $t_p$ will be greater than the number of available open seats (O), then the number of flex seats to be released should be equal to P−O (i.e., P minus O), if available. The prediction is adaptive in time. As data points are received, at a preferred granularity of 5 minutes or faster, a new prediction is made, and the amount of flex seats to be released is updated.

A prediction can also be based on an adaptive exponential functional model, which is given by the equation:

$$y(t)=A(t)(1-e^{-\lambda(t)t}) \quad \text{(Eqn. 6)}$$

where $A(t)$ and $\lambda(t)$ are parameters that are functions of time, and $y(t)$ is the cumulative ticket sales at time t. Hence the prediction of ticket sold P is given by using the currently estimated parameters, and setting $t=t_p$. The hazard function of this model is $A(t)*\lambda(t)$, and as these are adaptively modeled in time, almost any shape of hazard function can be modeled. This is, therefore, a generalization of the previously described exponential-gamma and Weibull-Gamma modeling methods. In particular the characteristic ticket sales rate that occurs during an on-sale in which $\lambda$ (the ticket sales rate) initially rapidly increases for 10-20 minutes then decays, is readily modeled.

The prediction algorithm proceeds as follows. Two data points should be available before the above parameters are estimated and the prediction begins. It is preferable that the data points be at 5 minutes and 10 minutes into on-sale so that ticket sales have stabilized. However, it can be important that the algorithm begin predicting as soon as possible. It is possible to implement various tests of statistical confidence to ensure that the initial two data points used have stable statistics. Therefore, data points may come in, for example, as fast as 1 minute apart, and the algorithm can automatically choose which points to use as the initial two-points based on calculated statistical confidence.

Best fit may be determined by a simulated annealing algorithm. In a simulated annealing algorithm, parameters A and $\lambda$ are moved in very small increments either up or down from their current values, and if the adaptive exponential function with the new parameters better fits the data points, then A and/or $\lambda$ are moved to the new values. This process is repeated.

At each point in time, a new A and $\lambda$ are calculated from actual data points. After all the data points are collected, the different A's and $\lambda$'s are preserved as $A(t)$ and $\lambda(t)$. These functions of time can be used to predict future events.

In one example, data points $y_1$, and $y_i$ where $y_1$ is the first data point at 5 minutes, and $y_i$ is the current data point (at 10 or greater minutes). For point 1, the following initialization can be performed:

$$A=y_1*\ln(\text{PredictTime})/\ln(t_1)$$

Lambda=1
SumPredict=0
MeanPredict=0
alpha=0.01
AnnealIterations=1000
TotalReleasedFlex=0
FOR points i>=2 do the following:

$$y\text{Est}_1=A*(1-\exp(-\text{Lambda}*t_1))$$

$$y\text{Est}_i=A*(1-\exp(-\text{Lambda}*t_1))$$

$$\text{RMSerror}=\text{sqrt}(((y_1-y\text{Est}_1)^2+(-y\text{Est}_i)^2)/2)$$

A stochastic simulated annealing algorithm can be implemented to estimate the parameters A and Lambda for the current data point, as follows:

```
FOR 1 to AnnealIterations DO
    'vary A first by plus or minus a very small number (alpha)
    IF RND( 1 ) > 0.5 THEN sign = 1 ELSE sign = -1
    NewA = A * (1 + sign * alpha)
    'calculate yEst1, yEsti and NewRMSerror using NewA
    yEst1 = NewA * (1 - exp( -Lambda * t1))
    yEsti = NewA * (1 - exp( -Lambda * ti))
    NewRMSerror = sqrt( ( (y1 - yEst1)^2 + ( yi - yEsti)^2) / 2)
    'use NewRMSerror if a better fit than the previous RMSerror
    IF NewRMSerror < RMSerror THEN 'accept the NewA as better
            A=NewA
            RMSerror = NewRMSerror
    END IF
    'vary Lambda by plus or minus a very small number (alpha)
    IF RND(1) > 0.5 THEN sign = 1 ELSE sign = -1
    NewLambda = Lambda * (1 + sign * alpha)
    'calculate yEst1, yEsti and NewRMSerror using NewLambda
    yEst1 = A * (1 - exp(-NewLambda * t1))
    yEsti = A * (1 - exp(-NewLambda * ti))
    NewRMSerror = sqrt( ( (y1 - yEst1)^2 + ( yi - yEsti)^2) / 2)
    'use NewRMSerror if a better fit than the previous RMSerror
    IF NewRMSerror < RMSerror THEN 'accept the NewLambda as better
    Lambda = NewLambda
    RMSerror = NewRMSerror
    END IF
END FOR      'end of the annealing loop
```

When the annealing loop finishes the parameters A and Lambda are estimated and can be used to form the current prediction. The prediction is calculated by the following:

$$y\text{Predict}_i=\text{INT}(A*(1-\exp(-\text{Lambda}*\text{PredictTime})))$$
'this is the current point prediction
SumPredict=SumPredict+yPredict$_i$ MeanPredict=INT(SumPredict/(i−1))' mean from
    point 2 to the current point 'Perform a correction on the mean prediction as follows:

```
IF MeanPredict < y_i THEN   'prediction should not be less than current data point
    IF yPredict_i > y_i THEN
        MeanPredict = yPredict_i   'use the current prediction instead of the mean
    ELSE
        MeanPredict = y_i          'set equal to current data
    END IF
END IF
```

MeanPredict is then used to release flex seats:

```
CurrentReleaseFlex = ( MeanPredict − StartOpen ) − TotalReleasedFlex
IF CurrentReleaseFlex < 0 THEN CurrentReleaseFlex = 0 'cannot un-release seats
IF ( CurrentReleaseFlex + TotalReleasedFlex ) > StartFlex THEN
    CurrentReleaseFlex = StartFlex − TotalReleasedFlex 'cannot release > remaining
END IF
TotalReleasedFlex = TotalReleasedFlex + CurrentReleaseFlex
```

One can also use the number of inquiries to improve the prediction algorithm. An inquiry (or enquiry) is a ticket or set of tickets that is currently being held for a short amount of time (e.g., 2 minutes) while a potential customer decides to buy or not to buy. An inquiry can end if a user declines to buy tickets, if the user buys the ticket, or upon timeout of the hold time. Inquiries are therefore a predictor of sales for a short time (e.g., 2-10 minutes) into the future. By using a prediction of the number of sales within a short time, Δt, in the future by using the inquiries, one can improve the prediction model previously described.

A prediction of the number of tickets to be sold within a short time in the future can be modeled by the following linear model:

$$y_{t+\Delta t} = y_t + \beta_t E_t \Delta t \quad \text{(Eqn. 7)}$$

where $y_{t+\Delta t}$ is an estimate of the number of tickets sold at a point t+Δt, $y_t$ is the number of tickets currently sold at time t, $\beta_t$ is a parameter that is estimated from the data, $E_t$ is the current number of inquiries, and Δt is a small period of time.

The prediction $y_{t+\Delta t}$ can be used in the previous algorithm as follows. Instead of using two points to estimate the parameters A and Lambda, one uses three points: $y_{t+\Delta t}$, $y_i$, and $y_1$. Thus, the previous annealing algorithm will compute and minimize 3 component error estimates, i.e.

$$\text{NewRMSerror} = \sqrt{((y_1 - y\text{Est}_1)^2 + (y_i - y\text{Est})^2 + (y_{i+1} - y\text{Est}_{i+1}))/3)}$$

where $y_{i+1} = y_{t+\Delta t}$.

The parameter $\beta_i$ is estimated as follows.

$$\beta_i = (y_{i+1} - y_i)/(t_{i+1} - t_i)*E_i) = (dy/dt_i)/E_i$$

That is, $\beta_i$ is the rate of ticket sales divided by the number of inquiries. One then can make the estimate that $\beta_{i-1} = \beta_i$. Then for any point i, the future point $y_{i+1} = y_{t+\Delta t}$ can be estimated from current and past data as follows:

$$y_{i+1} = y_i + ((y_i - y_{i-1})/(t_i - t_{i-1}))*(E_i/E_{i-1}))\Delta t$$

where Δt is a small time period between the current point and the future point.

Note that as $dy/dt_i = (y_i - y_{i-1})/(t_i - t_{i-1})$, one is essentially modeling the future rate of ticket sales as the current rate modified by the factor $E_i/E_{i-1}$, which is an indicator of the trend of the level of inquiries. In this way, the number of inquiries can be used to augment the existing data points with a data point slightly in the future. The extra data point helps in determining the proper parameters for one of the above models.

Figure 17:
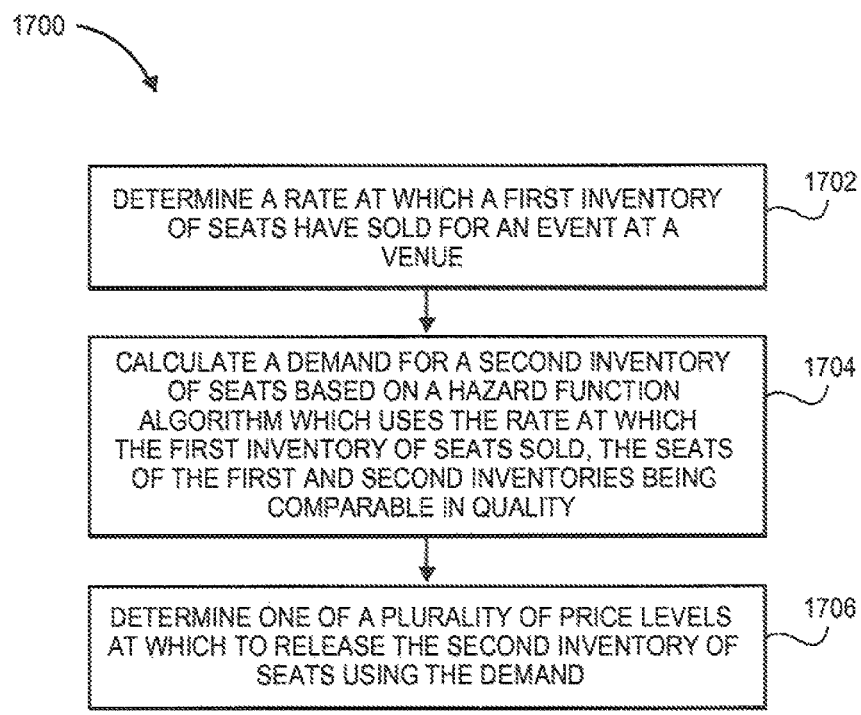
FIG. 17 is a flowchart with operations in accordance with an embodiment.

FIG. 17 is a flowchart with operations in accordance with an embodiment. In operation 1702, a rate at which a first inventory of seats have sold for an event at a venue is determined. In operation 1704, a demand is calculated for a second inventory of seats based on a hazard function algorithm which uses the rate at which the first inventory of seats sold, the seats of the first and second inventories being comparable in quality. In operation 1706, one of a plurality of price levels at which to release the second inventory of seat is determined using the demand.

One or more of the models above can be used to predict the number of sales for an event while a sale of tickets is in progress. Using that prediction, one can determine whether to flex up or flex down.

Figure 18:
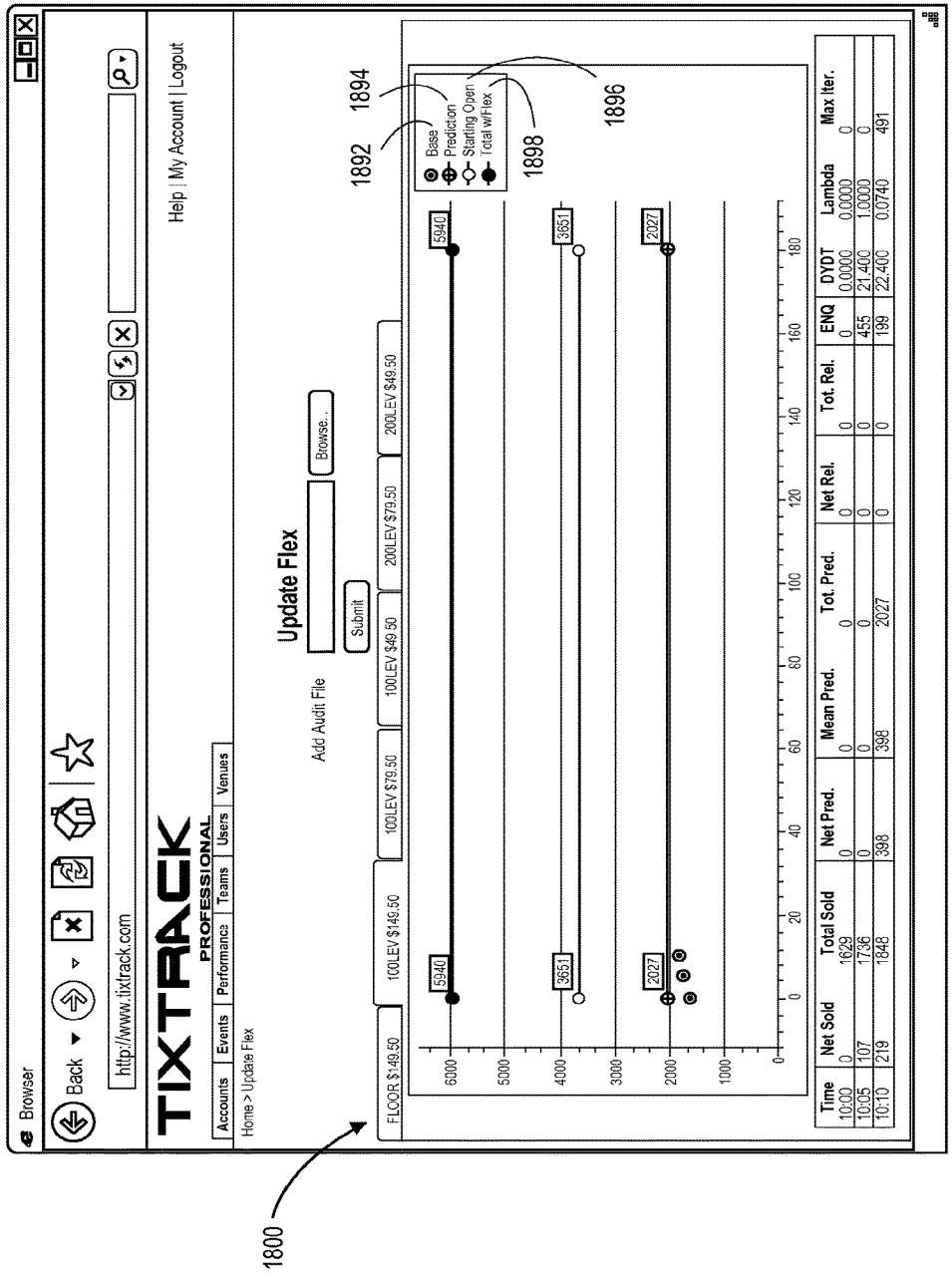
FIG. 18 is a plot of tickets sold on the 100 level of a stadium with respect to time in accordance with one embodiment of the present invention.

FIG. 18 is a plot of tickets sold on the one-hundred level of a stadium with respect to time in accordance with one embodiment of the present invention. Also plotted are horizontal lines delineating the predicted number of seats to be sold 1894, the number of open seats 1896, and the number of open seat and flex seats 1898. A user can view the number of seats sold in time (e.g., pseudo-real time) and determine, based on the predictions and hard lines, at what time and what price to release the flex seats. The prediction line can be updated with the prediction algorithms described above.

Inquires can be used in a different way to estimate the total sales for an event. The inventors have determined that there is a strong correlation between the trend of the ratio of tickets sold to inquires and the overall number of tickets that will be sold in an on-sale event.

Figure 19:
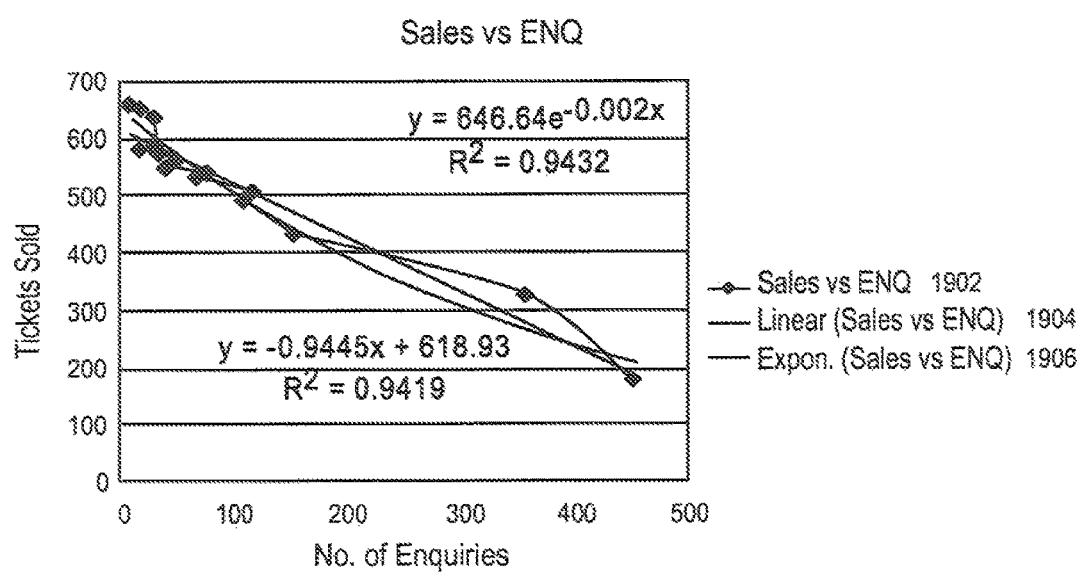
FIG. 19 is a plot of tickets sold versus number of inquires at different times for a particular event that can be used in accordance with one embodiment of the present invention.

FIG. 19 is a plot of tickets sold versus number of inquires at different times for a particular event that can be used in accordance with one embodiment of the present invention. As shown in the figure, the number of inquiries can be matched to the number of tickets that are sold at a given point in time. Data points 1902 are fit to a linear model 1904 or exponential model 1906 and interpolated or extrapolated as desired. Using only a few number of inquiry/tickets sold data points at the beginning of on-sale (e.g., the rightmost three data points in the figure), the model can be used to form an independent estimate of the tickets sold at the end of the on-sale. The intercept of the model function with the y-axis (vertical axis) gives the estimate. For linear model 1904, this estimate is 619 tickets; the actual number of tickets sold at the end of the on-sale for this event was 657 tickets.

In a preferred embodiment, the model is fitted point by point as data comes in. In an actual on-sale it is possible that the number of inquires increases initially before diminishing. This results in the intercept of the model line not crossing the y-axis in a positive location. To correct for this modeling problem, the algorithm can wait until the number of inquires decreases, and then declare this point the 'start point.'

A least squares straight line fit can be fit to the inquiry data. Alternatively, a least squares straight line fit can be fit to the natural log of the data in order to determine an exponential fit.

The linear model, the exponential model, or both can be used to estimate final ticket sales. To use both, the prediction from the linear model and exponential model can be averaged together. An alternative method is to weight the linear model and exponential model differently, where the weightings are determined from the data as it comes in point by point.

The estimate of the final on-sale sales using inquiries can be used independently or in conjunction with the previously disclosed methods for estimating final sales.

The number of seats that are recommended for release can be correlated to specific regions of the venue so that tickets are flexed in a uniform manner. For instance, it may be desirable to flex an entire row at one time rather than flexing up the price of some seats in a row while others are left at a lower price. The flex recommendation can be integrated with the venue configuration information from the maps.

In addition to flexing entire rows, it may be desirable to flex seats by 'x-number.' An x-number is a feature that some ticketing software uses to further classify the seats in the venue. Typically, x-numbers identify which seats are presumed better than other seats. An x-number does not need to include an entire section but can be a sub-section; however, an x-number does not normally include seats in more than one section. X-numbers are assigned to sections or portions of sections and can be utilized to prioritize the sale of tickets. It may be desirable to flex seats within one x-number, and this information may also be contained in the venue configuration stored within the system.

In addition to the total additional revenue that an event can generate, additional factors may be important in prioritizing sales for flex pricing. One such factor is sales momentum, such as a sell out, which may provide potential customers with the indication that the tickets are in limited supply and may also increase the excitement associated with the event. Also, the remaining inventory may be considered along with the likelihood that a game will sell out (i.e., the momentum aspect of focus). In practice, group sales usually drop off two to four weeks prior to the event while single event tickets pick up as the event approaches. Historical trends regarding single and group event tickets can be factored in to provide a more accurate indication of additional forecast ticket sales. In certain aspects, this information can be combined with the total revenue forecasts to create a clear picture of likely sell outs. If a sell out is likely, then prices can be flexed accordingly to maximize revenue.

(6) Posting Inventory to the Secondary Market

In addition to or instead of changing or flexing the price of inventory in the primary market, it may be desirable for a seller in the primary market to sell some of the inventory directly on the secondary market. For instance, tickets in the first few rows of floor seats at a concert may sell for a higher price on the secondary market than the original face value of the ticket. This may also be true of the first rows, even in the second or third level of a venue.

To capitalize on the higher prices, key questions the primary ticket seller encounters are: (1) how many and which tickets should be held from the primary market and released to the secondary market, and (2) at what price should the tickets be released?

The present invention provides algorithms which can recommend answers to the above questions of "how many tickets should be released?" and "at what price?" The algorithms ensure a high probability that these tickets will be among the "best" value of all secondary tickets. Because the recommended tickets will be of greater value than other tickets listed on the secondary markets for the same event, it is probable that the recommended tickets will actually be sold and realize the potential extra revenue.

The first step in the algorithm is to produce a list of the tickets on the secondary market(s) by equivalent or comparable section for the event. This utilizes the crawling and analysis software previously described.

Referring back to FIG. 9, comparable sections of seats include those with similar viewing quality for the event. For the exemplary configuration in FIG. 9, sections 115 and 128 are comparable to each other in that they are each an equal distance from the stage. Likewise, sections 117 and 126 are also comparable to each other. However, sections 117/126 would typically be considered as having a higher viewing quality than sections 115/128 because sections 117/126 are closer to the stage. For sporting events in which the entire field area of the stadium is the viewing area of interest, section 115, 117, 128, and 126 would all be comparable to each other in that they are an equal distance from the center point of the field.

Once equivalent sections are defined (if desired) secondary listings for the event in question are aggregated by equivalent section. The data for each equivalent section is filtered.

Seat quality can also be objectively determined at the row or seat level. For example, one can create a scalar seat quality which takes into account the distance of the seat from the front of the stage, the height of the seat above the floor, the distance to an aisle, the direction of the stage from a straight out view from the seat, and the deviation from the centerline of the stadium. One can adjust weighting factors or other linear or non-linear parameters to better align with consumer preferences from actual data as discussed below.

However, objective determinations of seat quality do not always match subjective determinations of seat quality. A myriad of consumer preferences besides those outlined above often figure into one's determination of a value of a seat. Furthermore, just how much the objective determinations of seat quality affect one's preferences remains unknown. For example, a row closer to the field may be desired, but whether one row closer is worth $1, $5, or $50 more is difficult to establish. The algorithm compensates for many of these unknowns by using empirical data from the secondary market.

The second step in the algorithm is to model the relationship between secondary premium and row number. In general, the premium is highest for rows at the front of a section and decreases with increasing row number. This relationship is modeled using the functional form:

$$\text{Premium}_{row} = A * 1/(\text{Row}^{alpha}) \qquad \text{(Eqn. 8)}$$

with $\text{Premium}_{row}$ being the discount/premium calculated above and Row being the row number of the seat. The parameters A and alpha are extracted by using a best least squares fit to the data. Note that if alpha turns out to be positive, this means that the price is increasing with increasing row. In this case the model is rejected and no prediction can be made for this equivalent section.

The algorithm then uses the model to determine the price of the ticket, given that it is desired to achieve a certain minimum premium ($Premium_{desired}$) above face value. For example, this desired premium can be chosen as "Aggressive," "Moderate," or "Conservative" and set to a certain value, for instance $Premium_{desired}$=2.5, 2.0, or 1.5 respectively, indicating a price of 3.5, 3.0, or 2.5 times face value respectively.

Given one or more desired premiums, the algorithm starts at row 1 in a section and computes $Premium_{row}$ for each row using the above model. If $Premium_{row}$>=$Premium_{desired}$, then it is concluded that tickets can be released from hold for this row at price $(1+Premium_{row})$* Face, and have a high probability of actually selling in the secondary market. This is because these tickets will be better than or equal to the best value tickets currently on the secondary market. The result is a determination of how many rows of tickets could be placed in the secondary market for each equivalent price section given the desired minimum premium.

Because ticket data in the "best value" list may be sparse, the model $Premium_{row}$ may have large errors. For example, if only two tickets in the secondary market were at rows 15 and 20, the predicted premium for row 1 may be well off. In order to handle this, the algorithm also computes a "Data Quality" metric, QEQ, for each equivalent section. If this metric is below a threshold, then the data is rejected and no predictions are made for this comparable section. One preferred metric is given by: (Eqn. 9) QEQ=1−($ROW_{minimum}$/$ROW_{maximum}$) where $Row_{minimum}$ is the row number of the lowest row in the comparable section list and $Row_{maximum}$ is the row number of the highest row. This metric lies between 0 and 1 and has a small value if the minimum and maximum rows in the data are close together or far from Row 1.

While the calculations above define the number of rows of tickets, and therefore the total number of seats, that could be placed on the secondary market, it is desirable to release or post the tickets to the secondary market over time so as to not create more supply than demand.

The number of tickets to be released can be computed in various ways. For example, a certain number of tickets can be released at a fixed time interval (for instance every hour). It is preferable to release tickets depending on the number of tickets currently on the secondary markets so as not to depress prices. For example, the number of tickets that can be released can be determined by taking a fixed percentage of current listings. Ideally this number would be less than 50% and more likely less than 20% of the existing secondary listings. This calculation can be repeated as the listed seats sell, always maintaining a level of seats lower than some percentage of the total secondary listings. This method could also be further refined by considering the exact location within the venue and maintaining the number of listed tickets below a certain percentage of like tickets.

FIG. 20 shows an example of the algorithm's final recommendations to a user in summary form. Recommendations are shown for floor seating and fixed section seating along with potential secondary revenue for each seating area. The total potential secondary revenue is also shown.

FIGS. 21A and 21B show example outputs from the algorithm. Tabulated are aggressive ("A"), moderate ("M"), and conservative ("C") pricing and revenue potentials. The recommendation sections at the bottom of each figure are for different levels of "Aggressive Pricing." Also shown is the total potential extra revenue for each scenario. The recommendation sections for all the seating in the venue can be summarized in a web page such as that shown in FIG. 20.

In one embodiment, a system and method for determining the demand and pricing of inventory in a secondary market is provided. Software uses this information to determine if inventory should be removed from the available primary inventory to be sold on the secondary market. The software can either make suggestions to the user or make changes automatically without user involvement. This analysis can provide a specific value for each seat in the venue. The software can then recommend how many seats in each section should be removed from inventory and sold in the secondary market.

The analysis of on-sale demand described above in regard to modifying primary ticket pricing during the sale can predict if the event or if price sections will sell out. This same information can be used to determine how many and at which price secondary inventory should be released. For instance, if the analysis indicates that a certain price level will quickly sell out, then more inventory from these sections could be placed on the secondary market at a higher price. In this way, the calculation of on-sale demand can be coupled with the secondary market analysis to automatically determine how aggressively the secondary market should be utilized.

Software can combine ticket information from the primary and secondary markets and display all inventory in a single map. In this way, the total revenue from an event, whether derived from primary sales or from by selling inventory in the secondary market, can be tracked.

(7) Improved Display of Secondary Inventory for Sale

Not only can data from secondary markets be used to project total revenue for an event, the data can also be used at the section, row, or seat level to determine the market value of individual seats. The market value can be used to display a 'best value' seat or selection of seats to a user. This allows a user, who may not have the time or expertise to discern the benefits of a set of seats, to have a more independent basis for selecting good seats.

Figures 22A, 22B:
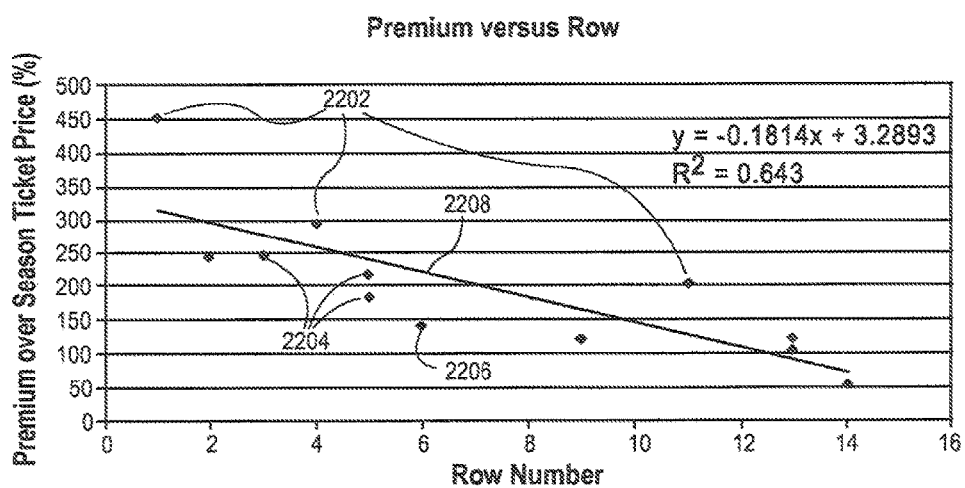
FIG. 22A is a plot of secondary market discounts/premiums of specific tickets versus row number.
FIG. 22B is a table of the data plotted in FIG. 22A.

FIG. 22A shows ticket premiums gathered and calculated from the secondary market plotted with respect to row number for a particular section in an arena. The data is fitted to linear model 2208. This model can be used to indicate to a customer where the 'best value' seat in the section is located. Note in the figure that tickets near the front (e.g., rows 2-4) are valued in the secondary market as 250%-300% over the season ticket price while tickets near the back (e.g., rows 13-14) are valued at less than half the premium (i.e., 50-125%) of the front seats.

In certain aspects, the deviation of the seat price from the model is determined in order to ascertain the best valued ticket available on the secondary market. For example, the fifth ticket 2206 in FIG. 22B is in row 6. From the linear model (i.e., $premium_{predicted}$=−0.1814* row_number+ 3.2893), the predicted premium is 2.2009 (220%). In contrast, the ticket premium in the secondary market is 141%. The ticket value, which is the predicted premium minus the premium in the secondary market, is thus 220%− 141%=79% (0.79). The best value ticket will have the highest ticket value and the lowest actual premium relative to that predicted by the fit for all tickets. This corresponds to the ticket that falls the farthest below the line in FIG. 22A. By comparing the ticket value for all tickets in this manner, the ticket with the best value when row number is considered is determined. Combining the results of this analysis with the analysis above that did not consider row number, two tickets for the section that represent the lowest price and the best value are determined. That is, the lowest price is the ticket on row 14, and the best value ticket is the one on row 6 (calculated above). Both of these tickets are stored for presentation to a purchaser.

It is also possible to determine relative value by first finding the lowest priced seat for the lowest listed row within a section or equivalent section. This listing is stored for future display. The next lowest row with a price lower than the stored listing is also stored. This process is repeated until the last row with a listing for the section or equivalent section is analyzed. The list of stored seats or listings can then be presented to a potential purchaser.

For presentation to a purchaser, a venue map can be displayed. The map can be produced by software that takes in the locations of seats from accurate blueprints or drawings of the arena seating and produces a Scalable Vector Graphics (.svg) format file. An .svg file can allow a user to zoom in to the smallest of details in the graphics file depicting a seat. Zooming in can allow the user to judge such things as the width, direction, whether there is a cup holder, and other personal considerations, if any.

Additional data can be presented to help the purchaser with his or her selection. For example, the average price or premium for tickets in a specific section or at a particular price point can be provided. This can allow the customer to see the price or premium of the selected seat relative to the price or premium of other similar seats.

It is possible to further reduce the number of choices that a purchaser has by comparing the optimal or best value seats to preferences that the purchaser has provided. One such preference is the number of seats that the customer wishes to purchase. In this aspect, any ticket listing with a number of seats below the required number is eliminated, thereby reducing the number of choices. Some other possible preferences are preferences in cost, value, or closeness to the event and how much the purchaser is willing to pay.

The user's preferences in terms of price, value, and location can be incorporated into the selection of seats to offer the user by computing a distance metric which gives an indication of the closeness of the particular seat offering to the user's stated preferences. This metric can range from 1 (exactly matches the users preference) to 0 (does not match at all). A threshold can then be put on the metric to offer only seats above the threshold.

In some instances, there are several sections in an arena at the same original ticket price. Referring back to FIG. 3, sections 101, 102, 119, 110, 111, and 112 all have the same original face value ticket price. In some cases, the value of one section may provide enhanced value relative to other sections. For instance, sections 101 and 111 may be considered superior sections since they are more centrally located to the court. In this case, the relative value can be determined as described above using only row number or the premium can be determined using a least squared analysis where row and section are treated as variables. In the latter case, the sections can be assigned a separate value based on their location. In this case, sections 101 and 111 are assigned one value and sections 102, 110, 112, and 119 are assigned a second value. The fit of premium to row and section can then be calculated.

If no original pricing information is known, the aggregated ticket prices can be compared on a section by section basis because it would not be possible to determine pricing on an original price basis. This may result in more listings than would be provided if the original ticket values were known but relative value of seats within a section can still be determined.

Figure 23:
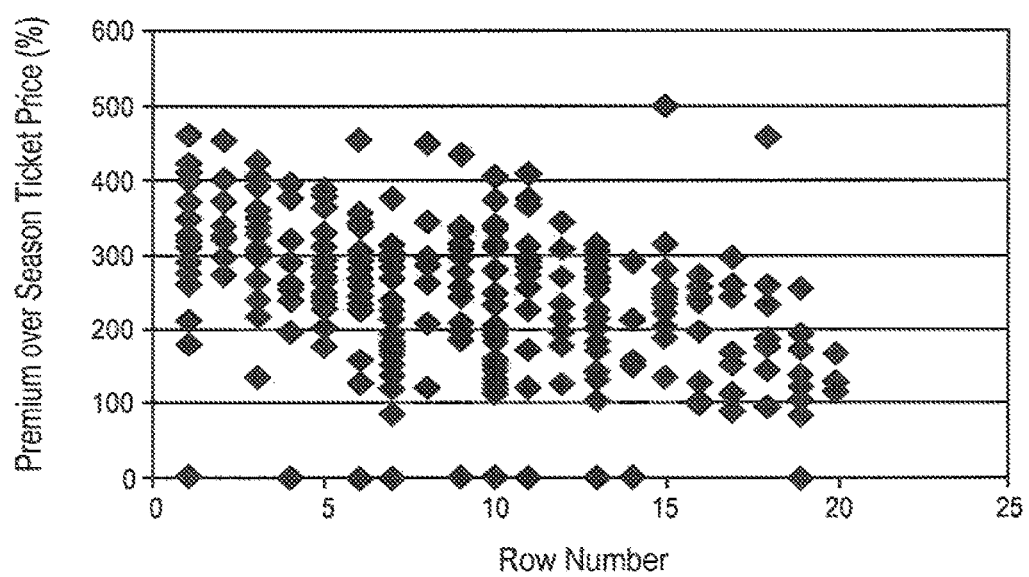
FIG. 23 is a plot of historical secondary market discounts/premiums for an event versus row number.

FIG. 23 shows a plot of premiums for seat tickets versus row numbers. It is apparent from the chart that there is a noticeable correlation between the row number and seat price for this example, even though the seats are separated from each other by mere tens of feet.

Figure 24A:
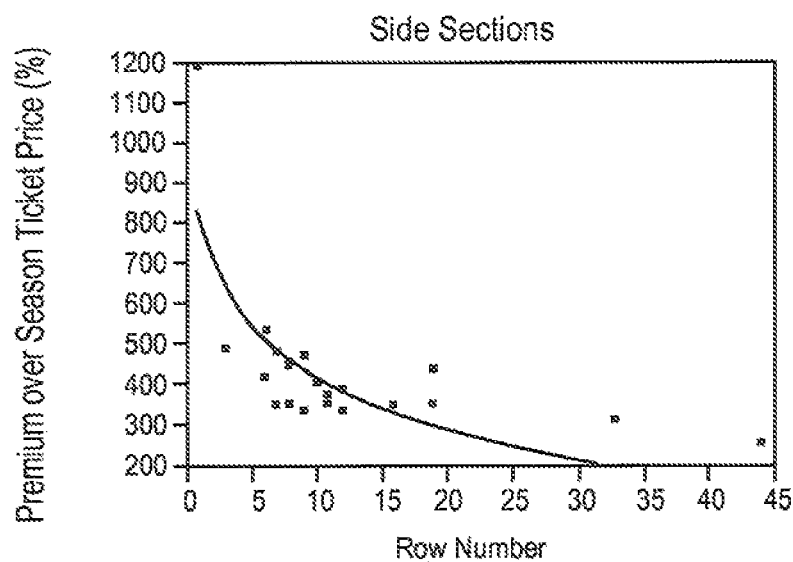
FIG. 24A is a plot of historical secondary market discounts/premiums of side sections for an event versus row number.
Figure 24B:
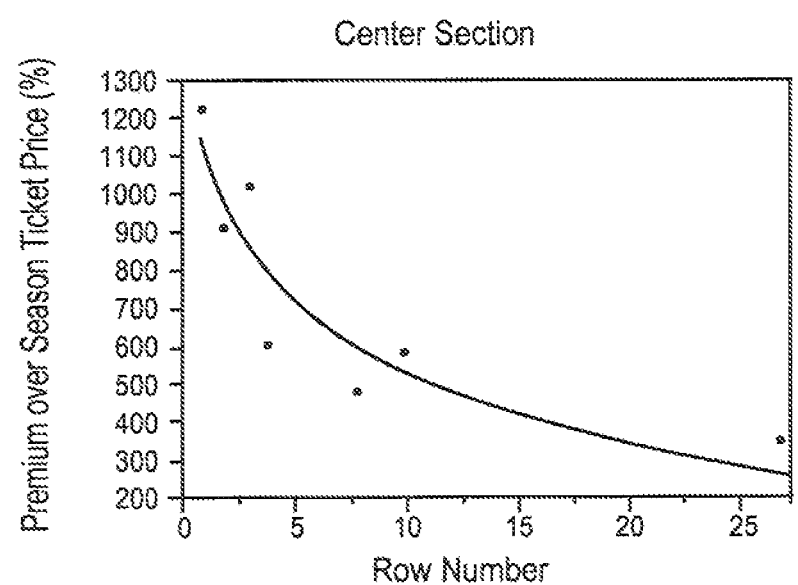
FIG. 24B is a plot of historical secondary market discounts/premiums of a center section for the same event as in FIG. 24A versus row number.

FIG. 24A and FIG. 24B show one analysis of prices and demand in the secondary market prior to the on-sale of that event. In this embodiment, this analysis determines the price as a function of row for seats near the stage of a concert. In FIG. 24A, data is analyzed for floor seats for the two sections at the left and right of the center section. FIG. 24B shows the same analysis for the floor seats in the center section. The secondary prices for seats in the same row are higher for the center section than for the left and right sections.

Although it is common knowledge that center sections are generally preferred to side sections, it was previously not known how much more center sections are worth than side sections. This analysis based on secondary markets gives concrete estimations of that difference in worth, down to the individual row.

Figure 25:
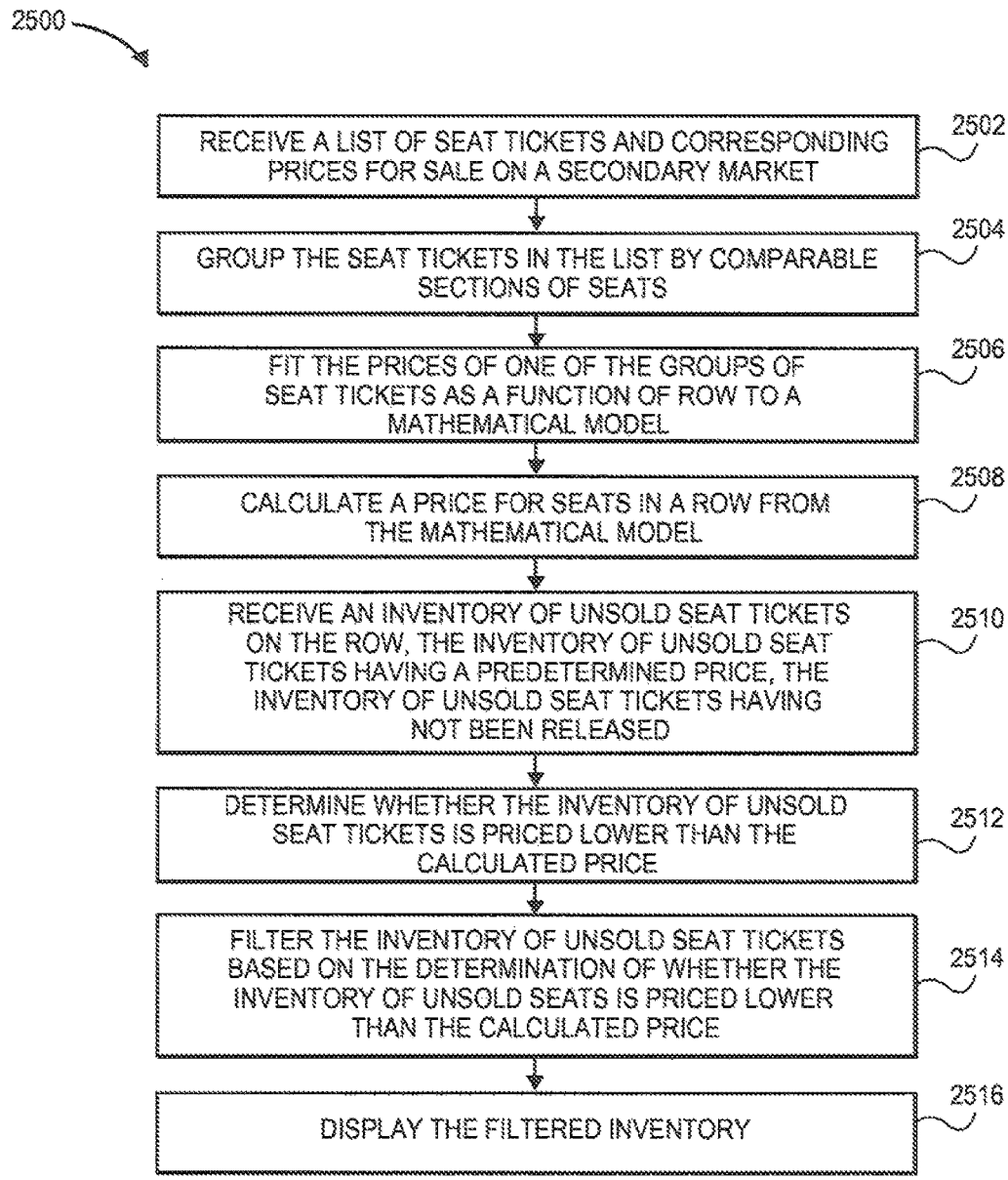
FIG. 25 is a flowchart with operations in accordance with an embodiment.

FIG. 25 is a flowchart with operations in accordance with an embodiment. In operation 2502, a list of seat tickets and corresponding prices for sale on a secondary market are received. In operation 2504, the seat tickets in the list are grouped by comparable sections of seats. In operation 2506, the prices of one of the groups of seat tickets are fit as a function of row to a mathematical model. In operation 2508, a price is calculated for seats in a row from the mathematical model. In operation 2510, an inventory of unsold seat tickets on the row is received. The inventory of unsold seat tickets have a predetermined price. In operation 2512, it is determined whether the inventory of unsold seat tickets is priced lower than the calculated price. In operation 2514, the inventory of unsold seat tickets is filtered based on the determination of whether the inventory of unsold seats is priced lower than the calculated price. In operation 2516, the filtered inventory is then displayed.

Figure 26:
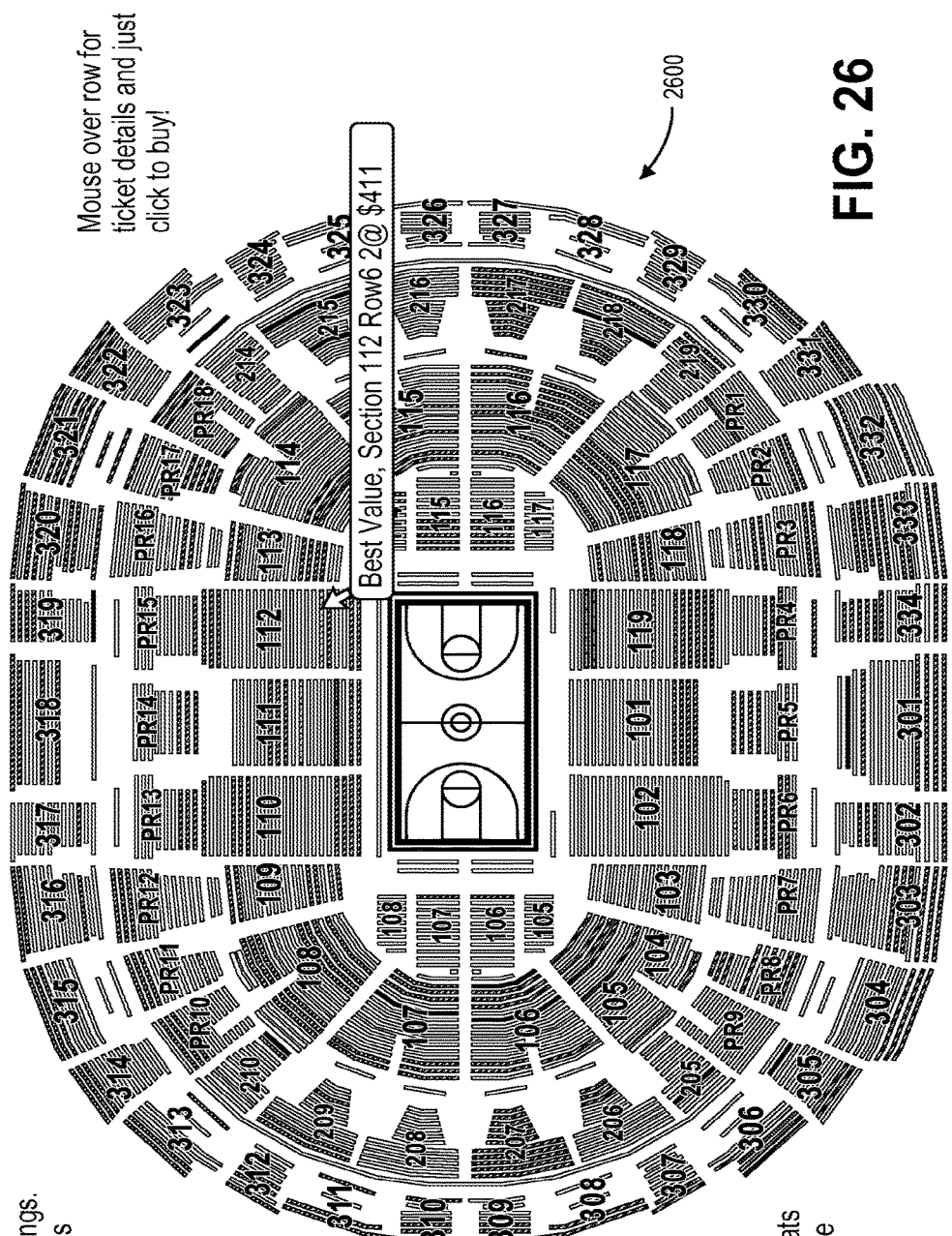
FIG. 26 illustrates a venue map showing seats available on a consumer web site in accordance with an embodiment.

FIG. 26 is a block diagram illustrating components of an exemplary operating environment in which various embodiments of the present invention may be implemented. The system 2600 can include one or more user computers, computing devices, or processing devices 2612, 2614, 2616, 2618, which can be used to operate a client, such as a dedicated application, web browser, etc. The user computers 2612, 2614, 2616, 2618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 2612, 2614, 2616, 2618 may also have any of a variety of applications, including one or more development systems, database client and/or server applications, and Web browser applications. Alternatively, the user computers 2612, 2614, 2616, 2618 may be any other electronic device, such as a thin-client computer, Internet-enabled gaming system, and/or personal messaging device, capable of communicating via a network (e.g., the network 2610 described below) and/or displaying and navigating Web pages or other types of electronic documents. Although the exemplary system 2600 is shown with four user computers, any number of user computers may be supported.

In most embodiments, the system 2600 includes some type of network 2610. The network may can be any type of network familiar to those skilled in the art that can support data communications using any of a variety of commercially-available protocols, including without limitation TCP/IP, SNA, IPX, AppleTalk, and the like. Merely by way of example, the network 2610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 2602, 2604, 2606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 2606) may be dedicated to running applications, such as a business application, a Web server, application server, etc. Such servers may be used to process requests from user computers 2612, 2614, 2616, 2618. The applications can also include any number of applications for controlling access to resources of the servers 2602, 2604, 2606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 2612, 2614, 2616, 2618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 2612, 2614, 2616, 2618.

The system 2600 may also include one or more databases 2620. The database(s) 2620 may reside in a variety of locations. By way of example, a database 2620 may reside on a storage medium local to (and/or resident in) one or more of the computers 2602, 2604, 2606, 2612, 2614, 2616, 2618. Alternatively, it may be remote from any or all of the computers 2602, 2604, 2606, 2612, 2614, 2616, 2618, and/or in communication (e.g., via the network 2610) with one or more of these. In a particular set of embodiments, the database 2620 may reside in a storage-area network ("SAN") familiar to those skilled in the art. Similarly, any necessary files for performing the functions attributed to the computers 2602, 2604, 2606, 2612, 2614, 2616, 2618 may be stored locally on the respective computer and/or remotely, as appropriate. In one set of embodiments, the database 2620 may be a relational database, such as Oracle 10g, that is adapted to store, update, and retrieve data in response to SQL-formatted commands.

Figure 27:
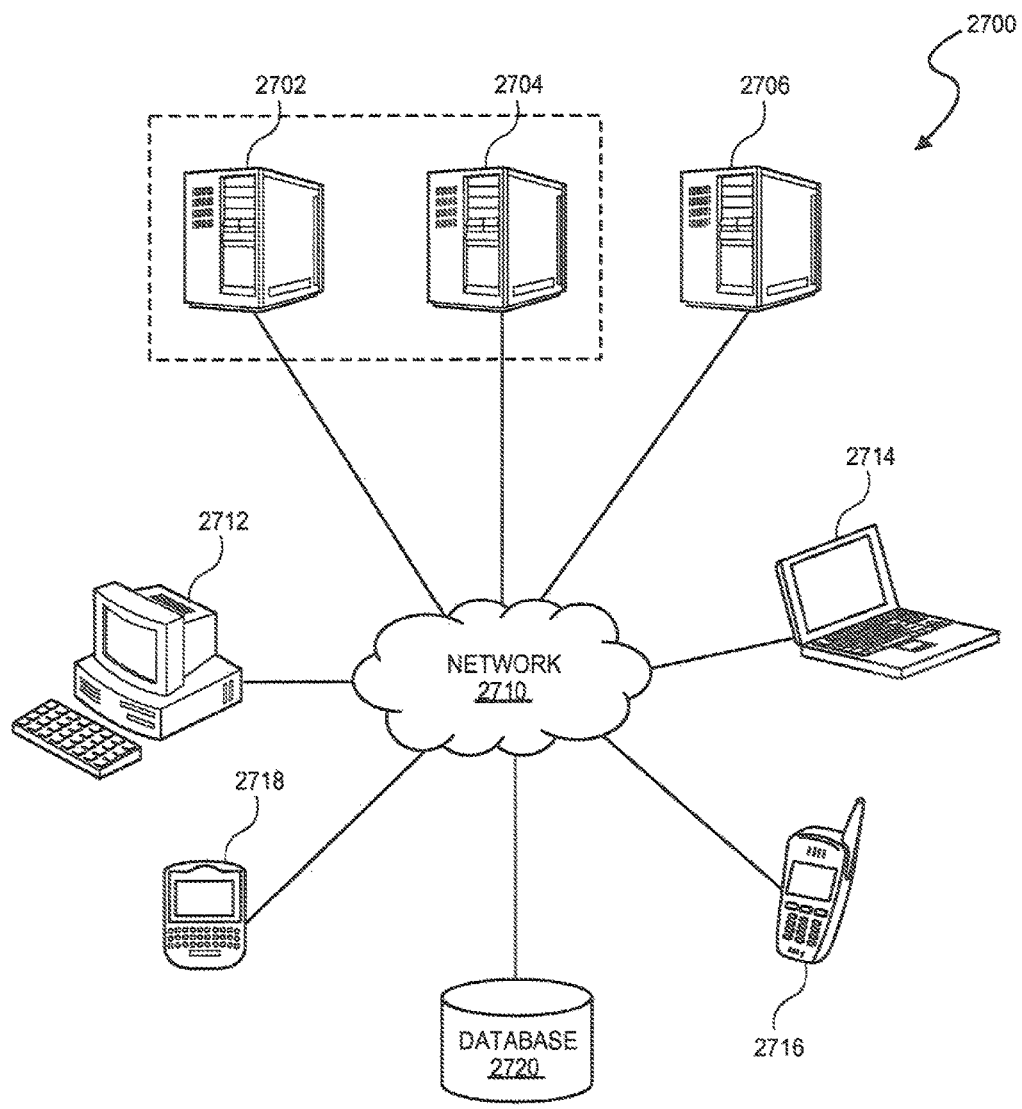
FIG. 27 illustrates components of a computer network that can be used in accordance with one embodiment of the present invention.
Figure 28:
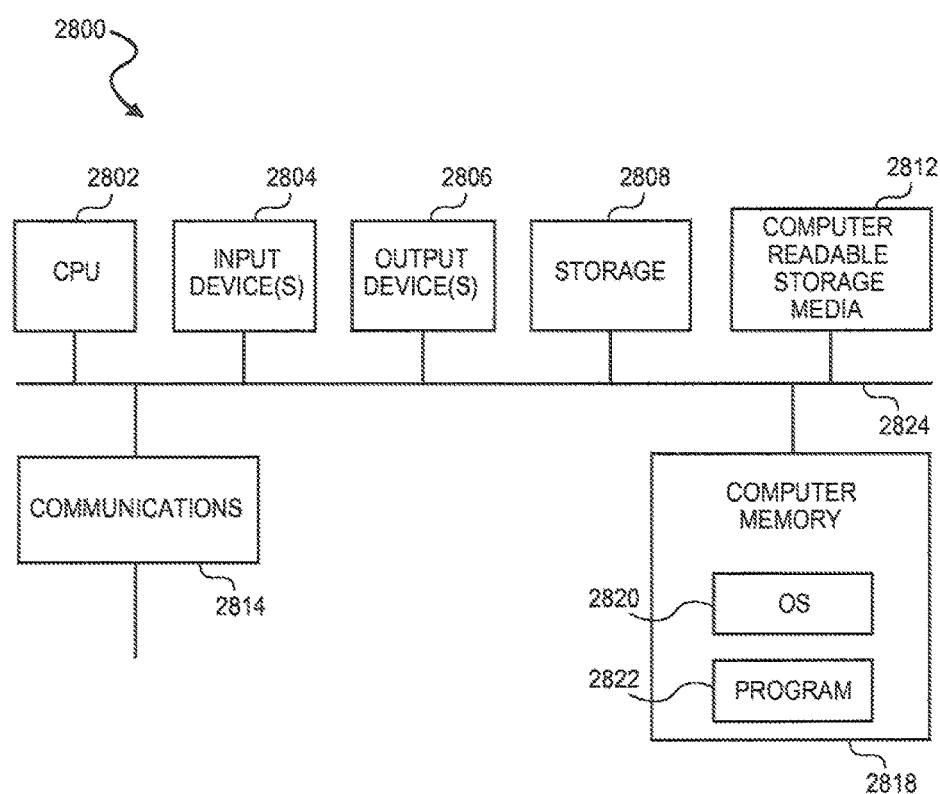
FIG. 28 illustrates components of a computerized device that can be used in accordance with one embodiment of the present invention.

FIG. 27 illustrates an exemplary computer system 2700, in which various embodiments of the present invention may be implemented. The system 2700 may be used to implement any of the computer systems described above. The computer system 2700 is shown comprising hardware elements that may be electrically coupled via a bus 2724. The hardware elements may include one or more central processing units (CPUs) 2702, one or more input devices 2704 (e.g., a mouse, a keyboard, etc.), and one or more output devices 2706 (e.g., a display device, a printer, etc.). The computer system 2700 may also include one or more storage devices 2708. By way of example, the storage device(s) 2708 can include devices such as disk drives, optical storage devices, solid-state storage device such as a random access memory ("RAM") and/or a read-only memory ("ROM"), which can be programmable, flash-updateable and/or the like.

The computer system 2700 may additionally include a computer-readable storage media reader 2712, a communications system 2714 (e.g., a modem, a network card (wireless or wired), an infra-red communication device, etc.), and working memory 2718, which may include RAM and ROM devices as described above. In some embodiments, the computer system 2700 may also include a processing acceleration unit 2716, which can include a digital signal processor DSP, a special-purpose processor, and/or the like.

The computer-readable storage media reader 2712 can further be connected to a computer-readable storage medium 2710, together (and, optionally, in combination with storage device(s) 2708) comprehensively representing remote, local, fixed, and/or removable storage devices plus storage media for temporarily and/or more permanently containing, storing, transmitting, and retrieving computer-readable information. The communications system 2714 may permit data to be exchanged with the network and/or any other computer described above with respect to the system 2700.

The computer system 2700 may also comprise software elements, shown as being currently located within a working memory 2718, including an operating system 2720 and/or other code 2722, such as an application program (which may be a client application, Web browser, mid-tier application, RDBMS, etc.). It should be appreciated that alternate embodiments of a computer system 2700 may have numerous variations from that described above. For example, customized hardware might also be used and/or particular elements might be implemented in hardware, software (including portable software, such as applets), or both. Further, connection to other computing devices such as network input/output devices may be employed.

Figure 29:
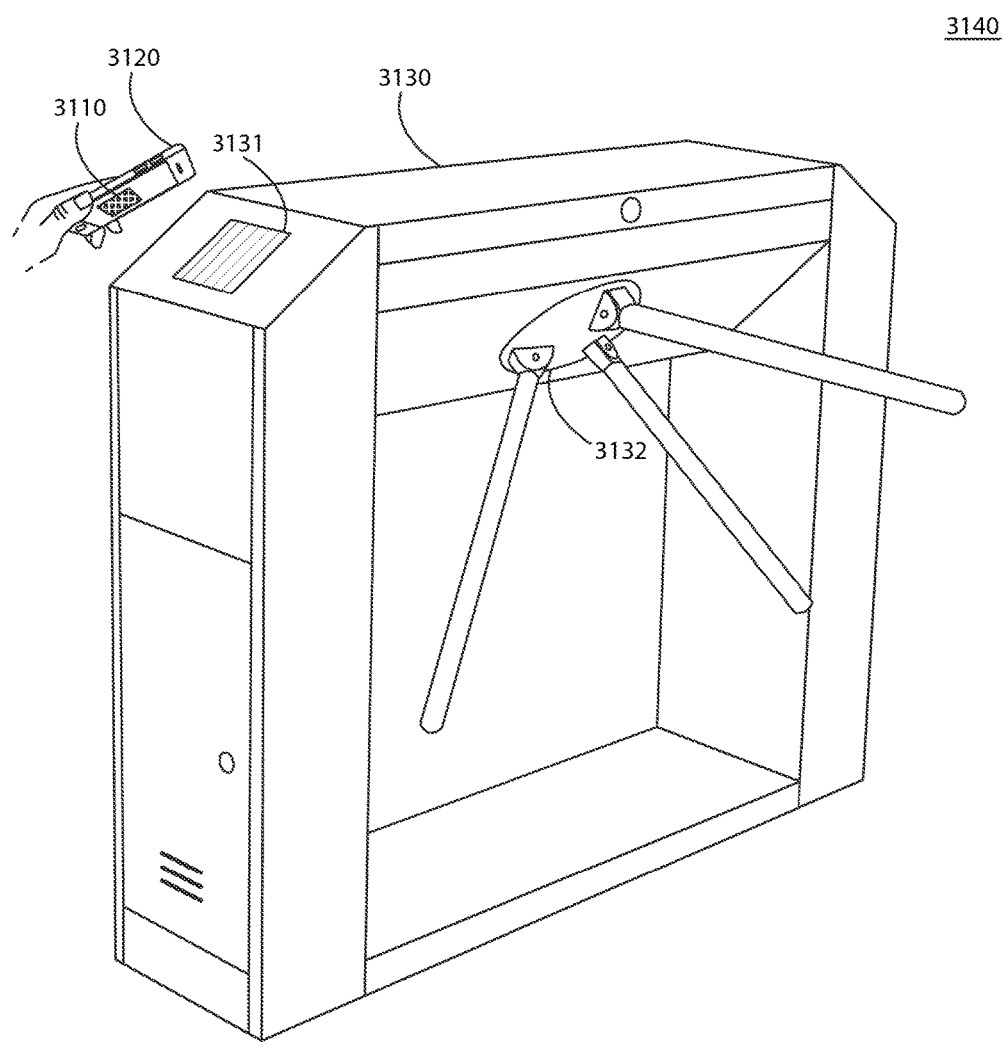
FIG. 29 illustrates a method of using an outputted ticket to access a gate to an event venue in accordance with one embodiment of the present invention.

FIG. 29 illustrates a method of using an outputted ticket to access a gate to an event venue in accordance with one embodiment of the present invention. As shown, a user 3101 can use an outputted ticket 3110 on a mobile device 3120 to access a turnstile gate 3130 to an event venue 3140, or other type of gate, door, or secured entry or exit mechanism. Although the outputted ticket 3110 is shown as a digital QR code shown on the display of the mobile device 3120, the outputted ticket 3110 can also be a physical printed ticket and can also include bar codes, Datamatrix codes, Microsoft "tags," and the like. Here, the turnstile gate 3130 includes a scanner 3131 and a turnstile barrier 3132, the rotating bars, that allows or restricts access in either direction. In this case, when the user scans the outputted ticket 3110 on the turnstile scanner 3131, the outputted ticket 3110 actuates a sensor to initiate the release of a locking mechanism on the turnstile barrier 3132, allowing the user to move through the turnstile gate 3130 to access the event venue 3140. In an alternative example, the gate can open automatically or perform other functions to allow or deny entry of the user with the outputted ticket. In an example, access is denied if the outputted ticket is invalid in some manner, that is, not authorized, or used, or other imperfection, among others. Of course, there can be other variations, modifications, and alternatives.

Figure 30:
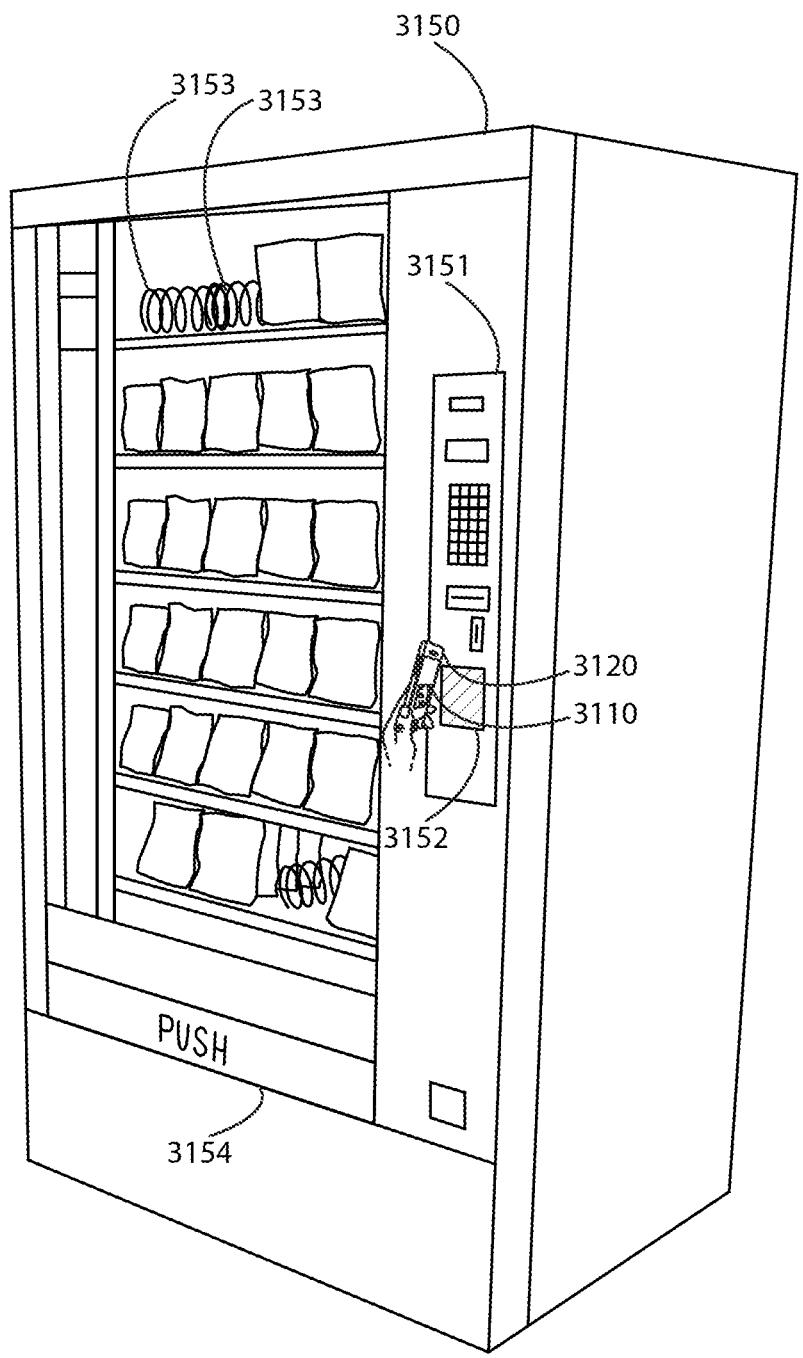
FIG. 30 illustrates a method of using an outputted ticket to access a dispenser within an event venue in accordance with one embodiment of the present invention.

FIG. 30 illustrates a method of using an outputted ticket to access a dispenser within an event venue in accordance with one embodiment of the present invention. As shown, a user 3101 can use the same outputted ticket 3110, as in FIG. 31A, to access the selection interface 3151 of a vending machine 3150. The gate structure can be a vending machine interface 3151 that includes a scanner 3152, a plurality of dispensing springs 3153, and a collection slot 3154. The outputted ticket 3110 can unlock the vending machine interface 3151 to provide the user access to the selection of drinks or snacks that are stored on the dispensing springs 3153. Once the user selects a particular drink or snack or other item, the vending machine 3150 dispenses the item for collection by the user. In an example, when the user scans the outputted ticket 3110 on the vending scanner 3151, the outputted ticket 3110 actuates a sensor to initiate the rotating of at least one of the dispensing springs 3153, releasing one of the stored items and dropping the item into the collection slot 3154. Of course, there can be other variations, modifications, and alternatives.

In an example, methods of the present invention can further include outputting at least one the selected tickets as an outputted ticket and initiating an entry process to a gate structure at an event venue associated with the selected tickets. The entry process can include using the outputted ticket to access the gate structure. The gate structure can include an access control gate, a turnstile, a vending machine interface, a gaming machine interface, a room door, a merchandise distribution interface, a parking gate, a locker, or a personal storage unit, or the like. Also, the gate structure can include any other type of gate, door, or secured entry or exit mechanism. In a specific example, the outputted ticket, digital or printed, can be used to unlock or lock a gate structure to deny access or allow entry through the gate structure. In an example, the locking/unlocking mechanism is provided by a device comprising a mechanical latch, a magnetic lock, an electrical lock, or other latch or lock mechanism. The locking/unlocking mechanism can also include a dispensing spring, a movable gate arm, a computer chip, or the like. In the unlock case, the outputted ticket can provide access to receive items such as food, beverages, video games, memorabilia, and the like. The outputted ticket can provide access to enter into a restricted space such as a room, a parking lot, an elevator, and the like. In the lock case, the outputted ticket can provide a means to restrict access to items or spaces, as described previously. Those of ordinary skill in the art will recognize other variations, modifications, and alternatives.

In an example, the gate structure comprises an access control gate, a turnstile, a vending machine interface, a gaming machine interface, a room door, a merchandise distribution interface, a parking gate, a locker, or a personal storage unit. In an example, the entry process uses the ticket to unlock or lock the gate structure, whereupon the unlocking occurs by actuating a sensor to initiate release of a device, comprising a mechanical latch, a movable gate arm, a magnetic lock, or electrical lock, to unlock the gate structure; whereupon the lock occurs by maintaining the device in a locked state to prevent entry through the gate.

In an example, the present invention provides a computer-implemented method for determining a number of open seats to be allocated for sale at a given price for an event during an initial sales period using a ticketing system programmed by a computer readable memory to perform the method. In an example, the method includes one or more or all of the following steps: providing, by a processor of the ticketing system, a ticketing web interface to a computing device via the Internet using a communications module of the ticketing system; placing, by the processor, an initial set of a plurality of open seats for sale at a first price via the ticketing web interface using the communications module, the initial set of the plurality of open seats having an initial number of open seats; storing, by the processor, information associated with the initial set of the plurality of open seats in a first portion of the computer readable memory; reserving, by the processor, at least one seat within a vicinity to each open seat from the initial set of the plurality of open seats such that each seat within the vicinity to each open seat from the initial set of the plurality of open seats is placed in a hold status, the hold status being not available for sale via the ticketing web interface; identifying, by the processor, a first number of open seats from the initial set of the plurality of open seats that have been sold or are being considered for purchase via the ticketing web interface using the information associated with the initial set of the plurality of open seats in the first portion of the computer readable memory; calculating, by the processor, a second number of the plurality of open seats to sell at a determined point in time based on a time dependence of the first number of open seats sold or being considered for purchase; determining, by the processor, if the initial number of open seats placed for sale at the first price is smaller than the second number of open seats that is calculated to sell, and when it is determined that the second number of open seats projected to sell is greater than the initial number of open seats placed for sale, releasing, by the processor, a first released set of the seats placed in the holding status within the vicinity of each open seat of the initial set of the plurality of open seats for sale at the first price; and outputting, by the processor, the number of seats that have been released to the ticketing web interface using the communications module, wherein the outputting of the number of seats that have been released causes the ticketing system to update the ticketing web interface using the communications module to display on the computing device with the released seats for sale and to enable a user of the computing device to purchase seats for the event from an updated set of seats, including the initial set of the plurality of open sets and the first released set of seats, at the first price following the initial sales period; outputting to a user a ticket associated with one of the number of seats that have been released; and using the ticket to open a gate structure associated with a venue for the event to allow the user to enter into the venue. Of course, there can be other variations, modifications, and alternatives.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for providing access to a venue using a ticketing system programmed by a non-transitory computer readable memory to perform the method, the method comprising:
providing, by a processor of the ticketing system, a ticketing web interface to a computing device via the Internet using a communications module of the ticketing system;
placing, by the processor, an initial set of a plurality of open seats for sale at a first price via the ticketing web interface using the communications module, the initial set of the plurality of open seats having an initial number of open seats;
storing, by the processor, information associated with the initial set of the plurality of open seats in a first portion of the computer readable memory;
reserving, by the processor, at least one seat within a vicinity to each open seat from the initial set of the plurality of open seats such that each seat within the vicinity to each open seat from the initial set of the plurality of open seats is placed in a hold status, the hold status being not available for sale via the ticketing web interface;
identifying, by the processor, a first number of open seats from the initial set of the plurality of open seats that have been sold or are being considered for purchase via the ticketing web interface using the information associated with the initial set of the plurality of open seats in the first portion of the computer readable memory;
calculating, by the processor, a second number of the plurality of open seats to sell at a determined point in time based on a time dependence of the first number of open seats sold or being considered for purchase by predicting a number of seats sold (P) at time tp, wherein the determining comprises determining if P will be greater than the number of available OPEN seats (O), and when it is determined that the number of predicted seats (P) that will sell is greater than the number of open seats (O), releasing, by the processor, additional seats that were placed in the hold status, where the number of additional seats is equal to P−O;
determining, by the processor, if the initial number of open seats placed for sale at the first price is smaller than the second number of open seats that is calculated to sell, and
when it is determined that the second number of open seats projected to sell is greater than the initial number of open seats placed for sale, releasing, by the processor, a first released set of the seats placed in the holding status within the vicinity of each open seat of the initial set of the plurality of open seats for sale at the first price; and
outputting, by the processor, the number of seats that have been released to the ticketing web interface using the communications module,
wherein the outputting of the number of seats that have been released causes the ticketing system to update the ticketing web interface using the communications module to display on the computing device with the released seats for sale and to enable a user of the computing device to purchase seats for the event from an updated set of seats, including the initial set of the plurality of open sets and the first released set of seats, at the first price following the initial sales period;
outputting to a user a ticket associated with one of the number of seats that have been released; and
using the ticket to open a gate structure associated with a venue for the event to allow the user to enter into the venue.

2. The method of claim 1 wherein the second number of open seats calculated to sell is based on sales between 1 and 3 hours after the start of sale; and wherein the number of released seats is equal to the second number of seats calculated to sell minus the initial number of seats allocated for sale.

3. The method of claim 1 wherein the using the ticket initiates an entry process to the gate structure at the venue associated with the ticket deny access beyond the gate structure.

4. The method of claim 1 wherein the initial set of the plurality of open seats comprises prime seats; wherein the initial set of the plurality of open seats is on a first portion of a venue map for the event provided by the ticketing web interface, the venue map being capable of display via the ticketing web interface on a display device coupled to the computing device.

5. The method of claim 1 wherein predicting comprises fitting the number of tickets that will sell to an adaptive exponential functional model.

6. The method of claim 1 wherein the first number of open seats considered for purchase is under an inquiry.

7. The method of claim 1 wherein the determined point in time ranges from 2 hours to 4 hours.

8. The method of claim 1 when it is determined that the second number of seats projected to sell is less than the initial number placed for sale, releasing, by the processor, a number of the seats within the vicinity of each open seat for sale at the second price, the second price is less than the first price.

9. The method of claim 1 wherein each of the seats within the vicinity of the open seats in the initial set of the plurality of open seats is a seat adjacent to the open seats.

10. The method of claim 1 further comprising:
placing, by the processor, a second set of the plurality of open seats for sale at a second price via the ticketing web interface;
storing, by the processor, information associated with the second set of the plurality of open seats in a second portion of the computer readable memory;
reserving, by the processor, at least one seat within a vicinity to each open seat from the second set of the plurality of open seats such that each seat within the vicinity to each open seat from the second set of the plurality of open seats is placed in the hold status, the hold status being not available for sale via the ticketing web interface;

identifying, by the processor, a third number of open seats from the second set of the plurality of open seats that have been sold or are being considered for purchase via the ticketing web interface;

calculating, by the processor, a fourth number of the plurality of open seats to sell at a determined point in time based on a time dependence of the third number of open seats sold or being considered for purchase;

determining, by the processor, if the number of open seats in the second set of open seats placed for sale at the second price is smaller than the fourth number of open seats that is calculated to sell;

when it is determined that fourth number of seats projected to sell is greater than the number of open seats in the second set of open seats placed for sale, releasing, by the processor, a second released set of the seats placed in the holding status within the vicinity of each open seat of the second set of the plurality of open seats for sale at the second price; and performing the placing, storing, reserving, identifying, calculating, and determining for an Nth set of a plurality of open seats for sale, where N is greater than 2 wherein the outputting of the number of seats that have been released causes the ticketing system to update the ticketing web interface displayed on the computing device with the released seats for sale and to enable a user of the computing device to purchase seats for the event from an updated set of seats, including the initial set of the plurality of open sets and the second released set of seats, at the second price during the initial sales period.

11. The method of claim 10 wherein the second set of the plurality of open seats being on a second portion of a venue map for the event provided by the ticketing web interface, the second portion of the venue map being capable of display via the ticketing web interface on the display device coupled to the computing device.

12. The method of claim 1 wherein the computing device is selected from a computer, a mobile device, or a phone device.

13. The method of claim 1 wherein the gate structure comprises an access control gate, a turnstile, a vending machine interface, a gaming machine interface, a room door, a merchandise distribution interface, a parking gate, a locker, or a personal storage unit.

14. The method of claim 3 wherein the entry process uses the ticket to unlock or lock the gate structure, whereupon the unlocking occurs by actuating a sensor to initiate release of a device, comprising a mechanical latch, a movable gate arm, a magnetic lock, or electrical lock, to unlock the gate structure; whereupon the lock occurs by maintaining the device in a locked state to prevent entry through the gate.

* * * * *